US012811420B2

(12) United States Patent
An

(10) Patent No.: US 12,811,420 B2
(45) Date of Patent: Nov. 24, 2026

(54) CHARGING DEVICE AND ELECTRONIC DEVICE ASSEMBLY

(71) Applicant: GUANGDONG OPPO MOBILE TELECOMMUNICATIONS CORP., LTD., Dongguan (CN)

(72) Inventor: Zhongyu An, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 744 days.

(21) Appl. No.: 18/197,304

(22) Filed: May 15, 2023

(65) Prior Publication Data

US 2023/0283089 A1 Sep. 7, 2023

Related U.S. Application Data

(63) Continuation of application No. PCT/CN2021/115729, filed on Aug. 31, 2021.

(30) Foreign Application Priority Data

Nov. 16, 2020 (CN) ........................ 202011283765.2

(51) Int. Cl.
*H02J 7/70* (2026.01)
*H02J 50/10* (2016.01)

(52) U.S. Cl.
CPC ................ *H02J 7/70* (2026.01); *H02J 50/10* (2016.02)

(58) Field of Classification Search
CPC ...... H02J 7/70; H02J 50/10; H02J 7/00; H02J 7/731; H02J 50/00; H02J 50/90; H02J 50/005; H02K 7/003
(Continued)

(56) References Cited

U.S. PATENT DOCUMENTS 4,873,677 A * 10/1989 Sakamoto .............. G04C 10/00 368/204
5,627,450 A 5/1997 Ryan et al.
(Continued)

FOREIGN PATENT DOCUMENTS

CN 203466598 U 3/2014
CN 204131179 U 1/2015
(Continued)

OTHER PUBLICATIONS

International Search Report and Written Opinion dated Nov. 22, 2021 in International Application No. PCT/CN2021/115729. English translation attached.
(Continued)

*Primary Examiner* — M Baye Diao
(74) *Attorney, Agent, or Firm* — Sheppard, Mullin, Richter & Hampton LLP

(57) ABSTRACT

Provided are a charging device and an electronic device assembly. The charging device includes a first housing, a second housing, a charging assembly, and a bracket. The second housing can translationally move and rotate relative to the first housing. The second housing is configured for placement of an electronic device. The charging assembly is disposed in the second housing and configured to charge the electronic device. The bracket is movable relative to the first housing and movable along with a rotation of the second housing relative to the first housing, enabling at least part of the bracket to be switched between a protruding state, in which the at least part of the bracket protrudes from the first housing or is flush with the first housing, and a received state, in which the at least part of the bracket is received in the first housing.

18 Claims, 17 Drawing Sheets

1

(58) Field of Classification Search
USPC .......................................................... 320/108
See application file for complete search history.

(56) References Cited

U.S. PATENT DOCUMENTS

| | | | | |
|---|---|---|---|---|
| 9,007,169 | B2 * | 4/2015 | Lee | G06F 1/1632 340/5.1 |
| 9,620,911 | B2 * | 4/2017 | Warren | H01R 13/6675 |
| 9,823,631 | B1 * | 11/2017 | Loo | G05B 15/02 |
| 10,554,033 | B2 * | 2/2020 | Girdzis | A47B 46/005 |
| 11,070,071 | B2 * | 7/2021 | Yuen | G04C 10/00 |
| 2009/0051319 | A1 | 2/2009 | Fang et al. | |
| 2016/0048164 | A1 * | 2/2016 | Dunkley | G06F 1/1681 361/679.09 |
| 2016/0064987 | A1 | 3/2016 | Sheu et al. | |
| 2017/0025886 | A1 | 1/2017 | Rohmer et al. | |
| 2017/0222680 | A1 * | 8/2017 | Yan | H02J 50/10 |
| 2019/0120479 | A1 | 4/2019 | Haskell | |
| 2020/0361355 | A1 * | 11/2020 | Chen | B60N 3/103 |
| 2022/0105008 | A1 | 4/2022 | Long et al. | |
| 2023/0131768 | A1 * | 4/2023 | Park | H02J 7/731 455/573 |

FOREIGN PATENT DOCUMENTS

| | | | |
|---|---|---|---|
| CN | 207665026 | U | 7/2018 |
| CN | 208226602 | U | 12/2018 |
| CN | 106253364 | B | 3/2019 |
| CN | 110021970 | A | 7/2019 |
| CN | 209641986 | U | 11/2019 |
| CN | 209948763 | U | 1/2020 |
| CN | 110901438 | A | 3/2020 |
| CN | 210581383 | U | 5/2020 |
| CN | 111224440 | A | 6/2020 |
| JP | 2005287198 | A | 10/2005 |
| JP | 2011010378 | A | 1/2011 |
| JP | 2011234514 | A | 11/2011 |
| JP | 2013086228 | A | 5/2013 |
| JP | 2014099984 | A | 5/2014 |
| JP | 2015019473 | A | 1/2015 |
| KR | 20150115256 | A | 10/2015 |
| WO | 2019190091 | A1 | 10/2019 |

OTHER PUBLICATIONS

The second office action issued in corresponding CN application No. 202011283765.2 dated Mar. 25, 2025. 13 pages with English translation.

Japanese Grant Notice for Japanese Application No. 2023-528268 mailed on Aug. 13, 2024.

The First Office Action from corresponding Chinese Application No. 202011283765.2, dated Aug. 26, 2024.

Chang et al., "Design research on the detection equipment of wireless headset charging box", China Excellent Master's Degree Thesis Full-text Database, Information Technology Series, Issue 10, Oct. 15, 2018. English abstract provided.

Japanese First Office Action with English Translation for JP Application 2023-528268 mailed Apr. 9, 2024.

WIPO, International Search Report and Written Opinion for International Application No. PCT/CN2021/115826, Nov. 24, 2021, 14 pages with English translation.

Notice of reasons for refusal issued in corresponding JP application No. 2023-529105 dated May 31, 2024, 8 pages with English translation.

The first office action issued in corresponding CN application No. 202011283946.5 dated Sep. 2, 2024, 17 pages with English translation.

Notice of Preliminary Rejection issued in corresponding KR application No. 10-2023-7019355 dated Aug. 1, 2025, 7 pages with English translation.

First Examination Report issued in corresponding IN application No. 202317040450 dated Apr. 28, 2026, 6 pages.

Non-final rejection issued in corresponding U.S. Appl. No. 18/317,446 dated May 7, 2026, 49 pages.

The first office action issued in corresponding CN application No. 202011283404.8 dated Aug. 27, 2024, 15 pages with English translation.

The second office action issued in corresponding CN application No. 202011283404.8 dated Mar. 26, 2025, 12 pages with English translation.

WIPO, International Search Report and Written Opinion for International Application No. PCT/CN2021/115712, Oct. 28, 2021, 13 pages with English translation.

Non-final rejection issued in corresponding U.S. Appl. No. 18/317,487 dated Mar. 16, 2026, 79 pages.

First Examination Report issued in corresponding IN application No. 202317040595 dated May 18, 2026. 9 pages.

Final Rejection issued in corresponding U.S. Appl. No. 18/317,487 dated Aug. 20, 2026. 33 pages.

Notice of Preliminary Rejection issued in corresponding KR application No. 10-2023-7016638 dated Jun. 2, 2026. 11 pages with English translation.

Final Rejection issued in corresponding U.S. Appl. No. 18/317,446 dated Sep. 16, 2026. 47 pages.

* cited by examiner

CHARGING DEVICE AND ELECTRONIC DEVICE ASSEMBLY

CROSS-REFERENCE TO RELATED APPLICATIONS

This application is a continuation of International Application No. PCT/CN2021/115729, filed on Aug. 31, 2021, which claims priority to Chinese Patent Application No. 202011283765.2, filed on Nov. 16, 2020. The disclosures of the aforementioned applications are hereby incorporated by reference in their entireties.

FIELD

The present disclosure relates to the technical field of electronic products, and more particularly, to a charging device and an electronic device assembly.

BACKGROUND

With the continuous development and popularity of electronic devices, the number of electronic devices is increasing constantly. Therefore, charging devices, as one of peripheral products of the electronic device, are attracting more attention.

SUMMARY

In view of this, a first aspect of the present disclosure provides a charging device. The charging device includes a first housing, a second housing, a charging assembly disposed in the second housing and configured to charge the electronic device, and a bracket. The second housing is movable relative to the first housing, the second housing being configured for placement of an electronic device. The bracket is movable relative to the first housing and is configured to move along with a movement of the second housing relative to the first housing, enabling at least part of the bracket to be switched between a protruding state, in which the at least part of the bracket protrudes from the first housing or is flush with the first housing, and a received state, in which the at least part of the bracket is received in the first housing.

A second aspect of the present disclosure provides an electronic device assembly. The electronic device assembly includes an electronic device and the charging device according to the first aspect of the present disclosure. The electronic device includes an induction coil and a battery. A charging coil and the induction coil cooperate with each other to charge the battery.

BRIEF DESCRIPTION OF THE DRAWINGS

In order to clearly explain technical solutions of embodiments of the present disclosure, drawings used in description of the embodiments of the present disclosure are briefly described below.

Figure 1:
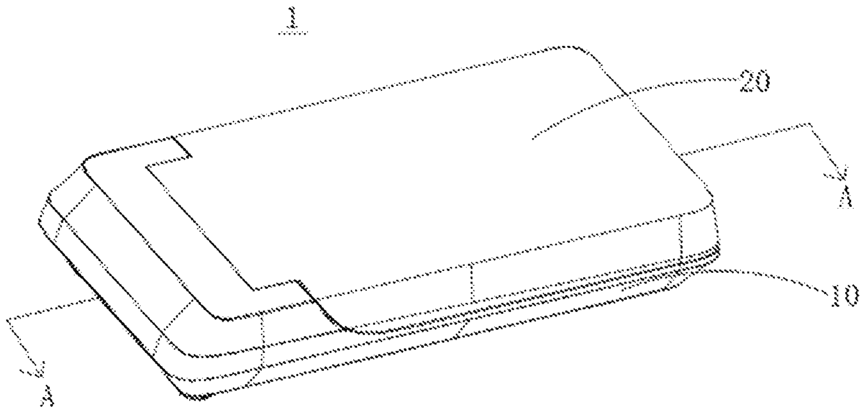
FIG. 1 is a perspective structural diagram of a charging device in an initial state according to an embodiment of the present disclosure.

Reference numerals in the figures are shown for example:

charging device—1, electronic device—2, electronic device assembly—3, induction coil—4, battery—5, first housing—10, first accommodation space—100, first surface—101, second surface—102, third surface—103, first sub-housing—11, second sub-housing—12, protruding portion—13, second accommodation space—130, first side wall—14, first sliding portion—141, second sliding portion—142, second side wall—15, first rotation groove—16, first rotation shaft—160, first bearing—161, first movable portion—171, second movable portion—172, stop portion—173, second housing—20, third accommodation space—200, first end—201, second end—202, third sub-housing—21, bottom wall—211, side wall—212, first through hole—213, fourth sub-housing—22, sealing portion—220, first connection member—23, first snap portion—231, second snap portion—232, second connection member—24, first connection portion—241, second connection portion—242, third connection portion—243, charging assembly—30, charging coil—31, heat dissipation bracket—32, bracket—40, guide groove—42, guide portion—43, anti-slip member—44, limiting member—45, third snap portion—450, motor assembly—50, motor—51, sliding member—52, third sliding portion—521, fourth sliding portion—522, connection portion—523, sliding block—524, sliding groove—525, third rotation groove—526, third rotation shaft—527, screw rod—55, second bearing—550, support member—56, bottom plate—561, side plate—562, sliding space—563, guide rod—57, second through hole—572, third through hole—573, fourth through hole—574, elastic member—58, processor—60, communication component—61, range sensor—62, loudspeaker—63, first switch—64, second switch—65, transmission member—70, end portion—71, middle portion—72, guide bar—73, avoidance groove—74.

DETAILED DESCRIPTION

Although preferred embodiments of the present disclosure have been illustrated and described above, it should be noted that, those skilled in the art can make various changes and modifications to these embodiments without departing from the principles of the present disclosure. Further, these changes and modifications should be regarded as falling within the scope of the present disclosure.

An embodiment provides a charging device. The charging device can include a first housing, a second housing, a charging assembly disposed in the second housing and configured to charge the electronic device, and a bracket. The second housing can translationally move and rotate relative to the first housing, the second housing being configured for placement of an electronic device. The bracket can be rotatable relative to the first housing and movable along with a rotation of the second housing relative to the first housing, enabling at least part of the bracket to be switched between a protruding state, in which the at least part of the bracket protrudes from the first housing or can be flush with the first housing, and a received state, in which the at least part of the bracket can be received in the first housing.

The charging device further can include a transmission member detachably connected to the second housing and the bracket. With the rotation of the second housing relative to the first housing, the bracket can be driven to move through an indirect cooperation, via the transmission member, between the second housing and the bracket.

The charging device can have a horizontal state. The horizontal state can include an initial state and a fallback state. When the charging device is switched to the fallback state from the initial state, and when a distance travelled by the second housing relative to the first housing can be equal to a first predetermined value, the transmission member can be connected to the bracket. When the distance travelled by the second housing relative to the first housing can be greater than the first predetermined value, the transmission member can be driven by the second housing to move to drive the bracket to move. The first housing can have a first surface and a second surface that are opposite to each other, and a third surface connecting the first surface with the second surface, at least part of the second surface being used to abut against the second housing.

The horizontal state can be a state in which the second housing can be parallel to the first housing. The initial state can be a state in which a vertical distance between the second housing and the third surface can be equal to a second predetermined value. The fallback state can be a state in which the second housing is moved relative to the first housing and the vertical distance between the second housing and the third surface can be greater than the second predetermined value.

When the distance travelled by the second housing relative to the first housing is smaller than the first predetermined value, a spacing can be defined between the transmission member and the bracket.

The first housing can include a first sub-housing and a second sub-housing that are connected to each other, and a protruding portion disposed on a side of the second sub-housing facing away from the first sub-housing. A first accommodation space can be enclosed by the first sub-housing and the second sub-housing. The protruding portion can include two first side walls opposite to each other, and a second side wall disposed between and connecting the two first side walls. A second accommodation space can be enclosed by the first side walls and the second side wall and in communication with the first accommodation space. The second housing can be rotatably connected to the first side walls.

The first side wall can have a first rotation groove defined on a side thereof close to the second accommodation space. The second housing can include a third sub-housing and a fourth sub-housing that are connected to each other. The third sub-housing can be closer to the first sub-housing than the fourth sub-housing. A third accommodation space can be enclosed by the third sub-housing and the fourth sub-housing. The third sub-housing can include a bottom wall and side walls connected to at least part of a periphery of the bottom wall in a bending manner, each of the side walls having a first through hole defined thereon. The charging device further can include a first rotation shaft. One end of the first rotation shaft can be disposed in the third accommodation space and connected to the third sub-housing. The other end of the first rotation shaft passes through the first through hole, and the other end of the first rotation shaft can be disposed outside the third accommodation space and arranged in the first rotation groove.

An extending direction of the first rotation groove can be parallel to a moving direction of the second housing.

A first movable portion can be disposed on a side of the first side wall close to the second accommodation space. A second movable portion can be disposed on a side of the bracket close to the first side wall. The first movable portion and the second movable portion cooperate with each other to enable the bracket to move relative to the first side wall.

A stop portion can be disposed on the side of the first side wall close to the second accommodation space. The stop portion can be closer to the first sub-housing than the first movable portion.

The transmission member can be disposed in the second accommodation space. The second housing further can include a first connection member. The first connection member can have an end connected to the third sub-housing and another end detachably connected to the transmission member.

The transmission member can include end portions opposite to each other, and a middle portion connecting the end portions. The first connection member can be connected to the end portions.

A guide rod can be disposed on a side of the transmission member close to the third sub-housing. A guide groove can be defined on a side of the bracket facing away from the third sub-housing. The guide rod can cooperate with the guide groove to enable the bracket to move when the transmission member can be connected to the bracket and driven by the second housing to move.

In the initial state of the charging device, the guide rod can be located in the guide groove or outside the guide groove.

The bracket can include a body and a guide portion connected to the body. The body can be further from the first sub-housing than the guide portion. The guide groove can be defined on a side of the guide portion facing away from the third sub-housing. An avoidance groove can be defined on the side of the transmission member close to the third sub-housing. The avoidance groove can be used to receive the guide portion, and the guide rod can be disposed on a groove wall of the avoidance groove defined on the transmission member.

A side of the guide groove close to the third sub-housing can be closer to the first sub-housing than a side of the guide groove facing away from the third sub-housing.

The guide groove can be in a linear shape.

A first sliding portion can be disposed on a side of the first side wall close to the second accommodation space. A second sliding portion can be disposed on a side of the transmission member close to the first side wall. The first sliding portion and the second sliding portion can cooperate with each other to enable the transmission member to slide on the first housing.

The first sliding portion can include a sliding groove. The second sliding portion can include a sliding block. In the fallback state of the charging device, the sliding block can be partially disposed in the sliding groove.

A sealing portion can be disposed on a side of the fourth sub-housing close to the protruding portion. In the initial state of the charging device, the sealing portion abuts against the protruding portion, and the bracket can be closer to the first sub-housing than the sealing portion.

In the initial state of the charging device, a side surface of the protruding portion facing away from the first sub-housing, a side surface of the bracket facing away from the first sub-housing, and a side surface of the fourth sub-housing facing away from the first sub-housing can be all flush with each other.

The charging device further can have a vertical state. The vertical state can be a state in which an included angle can be formed between the second housing and the first housing. When the charging device can be switched to the vertical state from the fallback state, a position of the bracket relative to the first housing remains unchanged.

When the charging device can be switched to the vertical state from the fallback state, the transmission member can be separated from the second housing.

The second housing further can include a first connection member. The first connection member can have an end connected to the third sub-housing and another end detachably connected to the transmission member. A first snap portion can be disposed at an end of the first connection member close to the transmission member. A second snap portion can be disposed on the transmission member. The first snap portion and the second snap portion can be engaged with each other to enable the first snap portion to be in a snap-fit connection with the second snap portion in the horizontal state of the charging device, and to enable the first snap portion to be separated from the second snap portion in the vertical state of the charging device.

In the horizontal state of the charging device, the first connection member can be closer to the first sub-housing than the transmission member.

The charging device further can include a limiting member disposed in the second accommodation space and connected to the second side wall. A third snap portion can be disposed on a side of the limiting member facing away from the second side wall. In the vertical state of the charging device, the first snap portion can be separated from the second snap portion, and the second snap portion can be in a snap-fit connection with the third snap portion.

The limiting member can be further from the first sub-housing than the transmission member.

In the protruding state of the bracket, the bracket can protrude from the first housing on the second surface.

The charging device further can include a motor assembly disposed in the first accommodation space. The motor assembly can be connected to the second housing. The motor assembly can drive the second housing to move and rotate relative to the first housing.

The motor assembly can include a motor, a screw rod connected to the motor, a sliding member sleeved on the screw rod and threaded to the screw rod, and a fourth sliding portion. A third sliding portion can be disposed on the sliding member. The third sliding portion and the fourth sliding portion cooperate with each other to enable the sliding member to slide on the screw rod when the motor operates. A third rotation groove can be defined on a side of the sliding member close to the second sub-housing. The charging device further can include a third rotation shaft. The third rotation shaft can have an end connected to the second housing and another end disposed in the third rotation groove.

The third rotation groove can extend towards the first sub-housing.

The motor assembly further can include a support member connected to the first sub-housing. A sliding groove can be defined on a side of the support member facing away from the first sub-housing. A sliding block can be disposed on a side of the sliding member close to the support member. The sliding block can be slidable in the sliding groove.

The motor assembly further can include a support member and a guide rod. The support member can include a bottom plate, and side plates that are connected to two opposite ends of the bottom plate in a bending manner. A sliding space can be enclosed by the bottom plate and the side plates. The sliding member can be disposed in the sliding space. A second through hole can be defined on the side plate. The screw rod passes through the second through hole and penetrates the sliding member. A third through hole can be defined on the side plate. A fourth through hole can be defined on the sliding member. The guide rod can be connected to the side plate and passes through the third through hole and the fourth through hole. The sliding member can be slidable on the guide rod through the fourth through hole.

The motor assembly further can include an elastic member disposed in the sliding space. The elastic member can be sleeved on the guide rod and disposed between the side plate and the sliding block. In the initial state of the charging device, the elastic member abuts against the side plate and the sliding block, and the elastic member can be in a compressed state.

The second housing further can include a second connection member. The second connection member can include a first connection portion, a second connection portion, and a third connection portion. The first connection portion can be at least partially disposed in the third accommodation space and connected to the third sub-housing. The second connection portion can be connected to the first connection member in a bending manner and disposed in the second accommodation space and the first accommodation space. The third connection portion can be connected to the second connection portion in a bending manner and disposed in the first accommodation space. An end of the third rotation shaft can be connected to the third connection portion.

The first connection member can be connected to the first connection portion.

The second housing can have a first end and a second end that are opposite to each other. The first end can be closer to the bracket than the second end, and the motor assembly can be rotatably connected to the first end.

When the charging device can be switched to the fallback state from the initial state, the motor starts to operate and drives the sliding block to slide through the screw rod, to drive the second housing to move relative to the first housing. In the fallback state of the charging device, the first rotation shaft can abut against a groove wall of the first rotation groove defined on the first side wall. When the charging device can be switched to the vertical state from the fallback state, through further sliding of the sliding block, another end of the third rotation shaft can be driven to slide in the third rotation groove, and the second housing can be driven to rotate relative to the first housing.

An embodiment further provides an electronic device assembly. The electronic device assembly can include an electronic device and the charging device as described in the above embodiments of the present disclosure. The electronic device can include an induction coil and a battery. A charging coil and the induction coil cooperate with each other to charge the battery.

Figure 2:
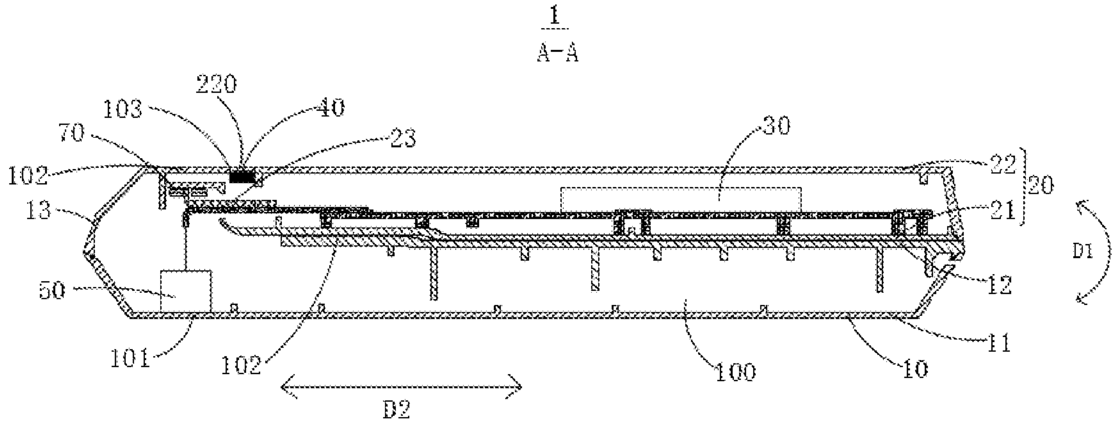
FIG. 2 is a schematic cross-sectional view along A-A direction as illustrated in FIG. 1.
Figure 3:
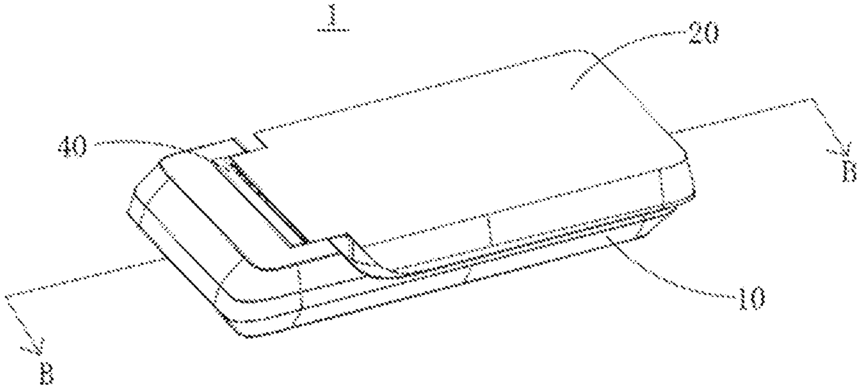
FIG. 3 is a perspective structural diagram of a charging device in a fallback state according to an embodiment of the present disclosure.
Figure 4:
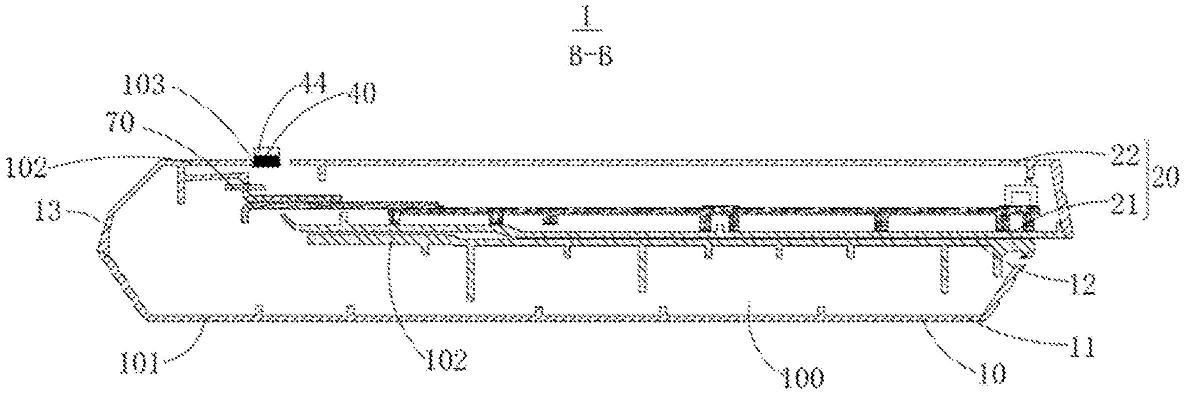
FIG. 4 is a schematic cross-sectional view along B-B direction as illustrated in FIG. 3.
Figure 5:
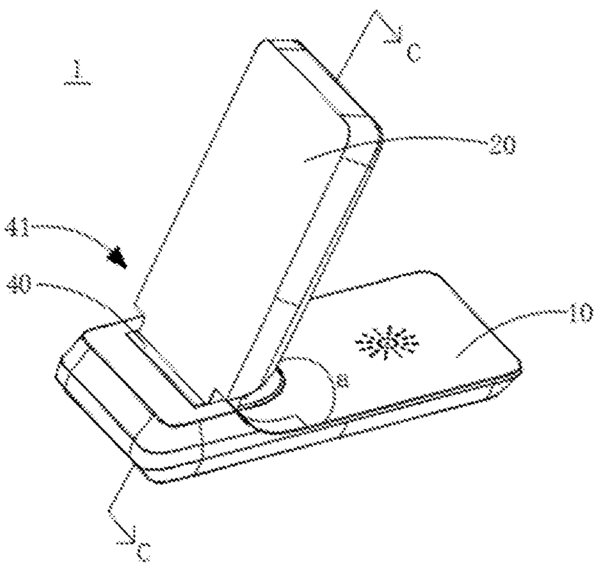
FIG. 5 is a perspective structural diagram of a charging device in a vertical state according to an embodiment of the present disclosure.

FIG. 1 is a perspective structural diagram of a charging device in an initial state according to an embodiment of the present disclosure. FIG. 2 is a schematic cross-sectional view along A-A direction as illustrated in FIG. 1. FIG. 3 is a perspective structural diagram of a charging device in a fallback state according to an embodiment of the present disclosure. FIG. 4 is a schematic cross-sectional view along B-B direction as illustrated in FIG. 3. FIG. 5 is a perspective structural diagram of a charging device in a vertical state according to an embodiment of the present disclosure. Referring to FIG. 1 to FIG. 5, the embodiment provides a charging device 1. The charging device 1 includes a first housing 10, a second housing 20 movable relative to the first housing 10, a charging assembly 30, and a bracket 40. The second housing 20 can be configured to translate and rotate relative to the first housing 10. The second housing 20 is configured for placement of an electronic device assembly 3. The charging assembly 30 is disposed in the second housing 20 and configured to charge the electronic device assembly 3. The bracket 40 can move relative to the first housing 10 and can also move along with a rotation of the second housing 20 relative to the first housing 10, such that at least part of the bracket 40 can be switched between a protruding state, in which the at least part of the bracket 40 protrudes from the first housing 10 or is flush with the first housing 10, and a received state, in which the at least part of the bracket 40 is received in the first housing 10.

The charging device 1 according to the present embodiment is configured to charge the electronic device assembly 3. The charging device 1 may be externally connected to a power supply, and the charging device 1, as an intermediate medium, can charge the electronic device assembly 3 with external electric energy. Alternatively, the charging device 1 itself has a battery 5 disposed therein and thus can transmit electric energy of the battery 5 to the electronic device assembly 3 for charging. In addition, the electronic device assembly 3 can be, but is not limited to, a mobile terminal such as a mobile phone, a tablet computer, a laptop, a palm computer, a personal computer (PC), a personal digital assistant (PDA), a portable media player (PMP), a navigation apparatus, a wearable device, a smart wristband, or a pedometer, or a fixed terminal such as a digital TV or a desktop computer. In the present disclosure, as an example, the electronic device assembly 3 is illustrated as the mobile phone.

The charging device 1 according to the present embodiment includes the first housing 10, and the second housing 20 configured for placement of the electronic device assembly 3. The first housing 10 can be regarded as a lower housing, and the second housing 20 can be regarded as an upper housing. The first housing 10 is rotatably connected to the second housing 20, such that the second housing 20 can rotate relative to the first housing 10. The first housing 10 may be in a static state while the second housing 20 rotate, the second housing 20 can rotate in a specific rotation direction as a direction D1 illustrated in FIG. 2. Since the electronic device assembly 3 is placed on the second housing 20, the electronic device assembly 3 also moves along with the rotation of the second housing 20 when the second housing 20 rotates relative to the first housing 10.

The present embodiment provides a vertical-horizontal state switchable charging device 1. That is, the charging device 1 have two states including a horizontal state (as illustrated in FIG. 1 and FIG. 3) and a vertical state (as illustrated in FIG. 5). The horizontal state is a state in which the second housing 20 is parallel to the first housing 10, i.e., a state in which the second housing 20 abuts against a surface of the first housing 10. The vertical state is a state in which an included angle is defined between the second housing 20 and the first housing 10, i.e., the second housing 20 is rotated relative to the first housing 10 and an end of the second housing 20 is rotated in a direction away from the first housing 10, such that the second housing 20 and the first housing 10 are no longer parallel to each other but define a predetermined included angle (as illustrated in an angle a of FIG. 4). Optionally, in the vertical state of the charging device 1, an angle between the second housing 20 and the first housing 10 may be greater than 0° and smaller than 90°. When the charging device 1 is in the vertical state, the electronic device assembly 3 on the second housing 20 is also rotated along with the second housing 20, thereby enabling the electronic device assembly 3 to "stands up" and satisfying user's requirements for checking the electronic device assembly 3 at different angles.

The second housing 20 in the charging device 1 according to the present embodiment may also be movable relative to the first housing 10 to make the charging device 1 be in an initial state and a fallback state, when the charging device 1 is in the horizontal state, a moving direction of the second housing 20 is a direction D2 in FIG. 2. That is, the horizontal state of the charging device 1 includes two states, i.e., the initial state and the fallback state. The initial state can be regarded as an original state in which the second housing 20 neither rotates nor moves relative to the first housing 10. The fallback state is a state in which the second housing 20 moves, but not rotates, relative to the first housing 10. A process of upraising the second housing 20 incudes that: the charging device 1 is firstly switched to the fallback state from the initial state and then switched to the vertical state from the fallback state. Similarly, a process of bring the second housing 20 down can include that: the charging device 1 is switched to the fallback state from the vertical state and then switched to the initial state from the fallback state.

The charging device 1 according to the present embodiment further includes the charging assembly 30. The charging assembly 30 is disposed in the second housing 20, and in the present embodiment, the charging assembly 30 is used to charge the electronic device assembly 3. Optionally, the charging device 1 may transmit electric energy through wire or wirelessly. That is, the charging device 1 may be a wireless charging device 1. Therefore, the charging device 1 provided in the present disclosure has two main functions, i.e., a vertical-horizontal state switchable function and a charging function. Optionally, the charging assembly 30 includes a charging coil 31, and the charging coil 31 is one of main components for charging the electronic device assembly 3. The charging coil 31 may be a wired charging coil 31 or a wireless charging coil 31. According to the embodiment, as an example, the charging coil 31 is the wireless charging coil 31. In this case, the charging device 1 is the wireless charging device 1, thereby further improving convenience of use of the charging device 1.

The charging device 1 according to the present embodiment further includes the bracket 40. The present disclosure provides the vertical-horizontal state switchable charging device 1, and when the charging device 1 is in the vertical state, the electronic device assembly 3 also stands up. However, the electronic device assembly 3 may tend to slip and fall from the second housing under the action of its own gravity. Therefore, the bracket 40 is provided in the present embodiment to abut an end of the electronic device assembly 3, thereby preventing the electronic device assembly 3 from slipping and falling. Moreover, since a position of the electronic device assembly 3 relative to the second housing 20 is limited by the bracket 40, the electronic device assembly 3 and the charging assembly 30 may be further limited in terms of their position, thereby improving charging efficiency and charging stability of the charging device 1.

However, in the related art, the bracket 40 is always disposed on and protrudes from the second housing 20, i.e., the bracket 40 is fixedly connected to the second housing 20. In this way, the above-mentioned effects can be achieved when the charging device 1 is in the vertical state. However, in related art, when the charging device 1 is in the horizontal state, the bracket 40 still protrudes from the second housing 20 all the time, thereby affecting flatness of a surface of the charging device 1. Moreover, in related art, due to the presence of the bracket 40, when the charging device 1 is in the horizontal state, the electronic device assembly 3 cannot be arbitrarily placed, and thus the position of the electronic device assembly 3 may be limited.

In order to solve the above problem, the bracket 40 is designed to be movable, i.e., the bracket 40 may move along with the rotation of the second housing 20, enabling the bracket 40 to be switched between a protruding state, in which the bracket 40 protrudes from the first housing 10 or is flush with the first housing 10, and the received state, in which the bracket 40 is received in the first housing 10. The phrase "move along with a movement" refers to that when the second housing 20 moves relative to the first housing 10, the bracket 40 may move along with the rotation of the second housing 20, which can also be understood that the second housing 20, when moving, drives the bracket 40 to move together. Optionally, as long as the second housing 20 moves, the bracket 40 moves along with the rotation of the second housing 20. Alternatively, the bracket 40 starts moving along with the movement only when the second housing 20 moves to a predetermined degree. In addition, when the second housing 20 moves relative to the first housing 10, the bracket 40 in the present embodiment moves along with the rotation of the second housing 20. Therefore, it can also be understood that the bracket 40 can be switched between the protruding state and the received state when the charging device 2 is switched between the initial state and the fallback state.

In addition, in the embodiment, the bracket 40 may move relative to the first housing 10. Optionally, the bracket 40 may be movably connected to the first housing 10. In the present embodiment, the bracket 40 is movably connected to the first housing 10. Firstly, although an included angle between the bracket 40 and the first housing 10 is not changed, a predetermined included angle may be enclosed between the bracket 40 and the second housing 20 due to the rotation of the rotatable second housing 20. When the second housing 20 rotates relative to the first housing 10, various different included angles may be formed. The included angle between the bracket 40 and the second housing 20 is fixed in the relative related art. In contrast, the present embodiment can satisfy different requirements. Secondly, the bracket 40 is movably connected to the first housing 10 to increase a distance between the bracket 40 and an end portion 71 of the second housing 20 in comparison to the related art. A size of the second housing 20 can be reduced for limiting the position of the electronic device assemblies 3 having the same size, thereby reducing an overall size of the charging device 1.

In addition, the bracket 40 moves along with the movement to switch the at least part of the bracket 40 between the protruding state, in which the at least part of the bracket 40 protrudes from the first housing 10 or is flush with the first housing 10, and the received state, in which the at least part of the bracket 40 is received in the first housing 10. The received state can be regarded as a state in which the charging device 1 is in the initial state and the bracket 40 is received in the first housing 10, i.e., a state in which the bracket 40 does not protrude from the first housing 10. The protruding state can be regarded as a state in which the bracket 40 protrudes from the first housing 10 or is flush with the first housing 10 when the second housing 20 moves to a predetermined position relative to the first housing 10 and the bracket 40 moves along with the rotation of the second housing 20. In addition, since the bracket 40 is already switched to the protruding state under the fallback state, the bracket 40 can remain in the protruding state when the charging device 1 is in the vertical state. In this way, the bracket 40 has two functions. For example, when the charging device 1 is in the fallback state or in the vertical state, the bracket 40 can protrude from or be flush with the first housing 10, and thus the bracket 40 can be configured to abut against the electronic device assembly 3. When the charging device 1 is in the initial state, the bracket 40 can be received in the first housing 10 and the bracket 40 does not protrude from the surface of the charging device 1, thereby improving the flatness of the surface of the charging device 1. Moreover, the electronic device assembly 3 may also be arbitrarily placed, thereby improving use convenience.

In addition, the protruding state of the bracket 40 according to the present embodiment has two positional forms. One positional form is that the bracket 40 protrudes from the first housing 10, and the other positional form is that the bracket 40 is flush with the first housing 10. In the present disclosure, a specific structure that the bracket 40 is flush with the first housing 10 is described in detail below.

In conclusion, according to the present embodiment, the bracket 40 can be switched between the protruding state and the received state by moving along with the rotation of the second housing 20. Therefore, the bracket 40 can protrude from the first housing 10 to limit the electronic equipment assembly 3 in the vertical state, and the bracket 40 can also be received in the first housing 10 to improve the flatness of the surface of the charging device 1 in the horizontal state, thereby improving diversity and convenience of the charging device 1. In the present disclosure, the specific structure of the charging device 1 and how the bracket 40 moves along with the second housing 20 are described in detail below.

Further referring to FIG. 2 and FIG. 4, in the present embodiment, the charging device 1 further includes a transmission member 70. The transmission member 70 is detachably connected to the second housing 20 and the bracket 40. During the rotation of the second housing 20 relative to the first housing 10, the second housing 20 indirectly cooperates with the bracket 40 through the transmission member 70 to drive the bracket 40 to move.

In the present disclosure, when the second housing 20 moves relative to the first housing 10, the bracket 40 can be driven to move by the second housing 20, or by the added transmission member 70 detachably connected to the second housing 20 and the bracket 40 as illustrated in the embodiment. Therefore, when the second housing 20 moves relative to the first housing 10, the bracket 40 is driven to move through the indirect cooperation between the second housing 20 and the bracket 40 via the transmission member 70. It can also be understood that, during the rotation of the second housing 20, the transmission member 70 connected to the second housing 20 can be driven to move by the second housing 20; and the bracket 40 connected to the transmission member 70 can be driven to move with the movement of the transmission member 70, such that the bracket 40 can switched between the protruding state and the received state. In the present disclosure, the more specific movement process is descried in detail below.

In addition, in the present embodiment, the transmission member 70 is detachably connected to the second housing 20 and the bracket 40, instead of being permanently connected to the second housing 20 and the bracket 40. It can also be understood that the transmission member 70 can be connected to the second housing 20 and the bracket 40 at some moments. However, at some moments, the transmission member 70 can be detached from the second housing 20 and the bracket 40 to form gaps between the second housing 20 and the bracket 40 and between the second housing 20 and the transmission member 70, such that the transmission member 70 cannot control the rotation of the second housing 20 and the bracket 40.

In an embodiment of the present disclosure, the charging device 1 has the horizontal state. The horizontal state includes the initial state and the fallback state. When the charging device 1 is switched to the fallback state from the initial state, and when a distance travelled by the second housing 20 relative to the first housing 10 is equal to a first predetermined value, the transmission member 70 is connected to the bracket 40. When the distance travelled by the second housing 20 relative to the first housing 10 is greater than the first predetermined value, the transmission member 70 is driven by the second housing 20 to move, so as to drive the bracket 40 to move. The first housing 10 has a first surface 101 and a second surface 102 that are opposite to each other, and a third surface 103 connecting the first surface 101 with the second surface 102. At least part of the second surface 102 is used to abut against the second housing 20.

The horizontal state is a state in which the second housing 20 is parallel to the first housing 10. The initial state is a state in which a vertical distance between the second housing 20 and the third surface 103 is equal to a second predetermined value. The fallback state is a state in which the second housing 20 moves relative to the first housing 10 and the vertical distance between the second housing 20 and the third surface 103 is greater than the second predetermined value.

In the present embodiment, the initial state and the fallback state are described from another perspective. The first surface 101 can be regarded as a lower surface of the first housing 10, the second surface 102 can be regarded as an upper surface of the first housing 10, and the third surface 103 can be regarded as a side surface connecting the upper surface to the lower surface. Moreover, the initial state is the state in which the vertical distance between the second housing 20 and the third surface 103 is equal to the second predetermined value, and in this case, the second predetermined value may be greater than or equal to 0. In the present embodiment, as an example, the second predetermined value is equal to 0. The fallback state is the state in which the second housing 20 moves relative to the first housing 10 and the vertical distance between the second housing 20 and the third surface 103 is greater than 0.

After the transmission member 70 is added, a motion process of the charging device 1 can be regarded as: when the charging device 1 is switched to the fallback state from the initial state and the distance travelled by the second housing 20 relative to the first housing 10 is equal to the first predetermined value, the transmission member 70 is connected to the bracket 40. The first predetermined value is greater than or equal to 0. When the first predetermined value is equal to 0, it means that the transmission member 70 is already connected to the bracket 40 when the charging device 1 is in the initial state. When the first predetermined value is greater than 0, it means that a spacing exists between the transmission member 70 and the bracket 40 and the transmission member 70 is not connected to the bracket 40, when the charging device 1 is in the initial state. When the distance travelled by the second housing 20 relative to the first housing 10 is smaller than the first predetermined value, the spacing still exists between the transmission member 70 and the bracket 40, and the transmission member 70 is not connected to the bracket 40. Until the distance travelled by the second housing 20 relative to the first housing 10 is equal to the first predetermined value, the transmission member 70 is connected to the bracket 40.

Subsequently, when the second housing 20 continues to move, the distance travelled by the second housing 20 relative to the first housing 10 is greater than the first predetermined value, the transmission member 70 is driven to move by the second housing 20, so as to drive the bracket 40 to move, thereby enabling the bracket 40 to be switched between the protruding state and the received state.

In the initial state, the transmission member 70 and the bracket 40 have two different position relations, which shall both fall within the scope of the present disclosure.

Figure 6:
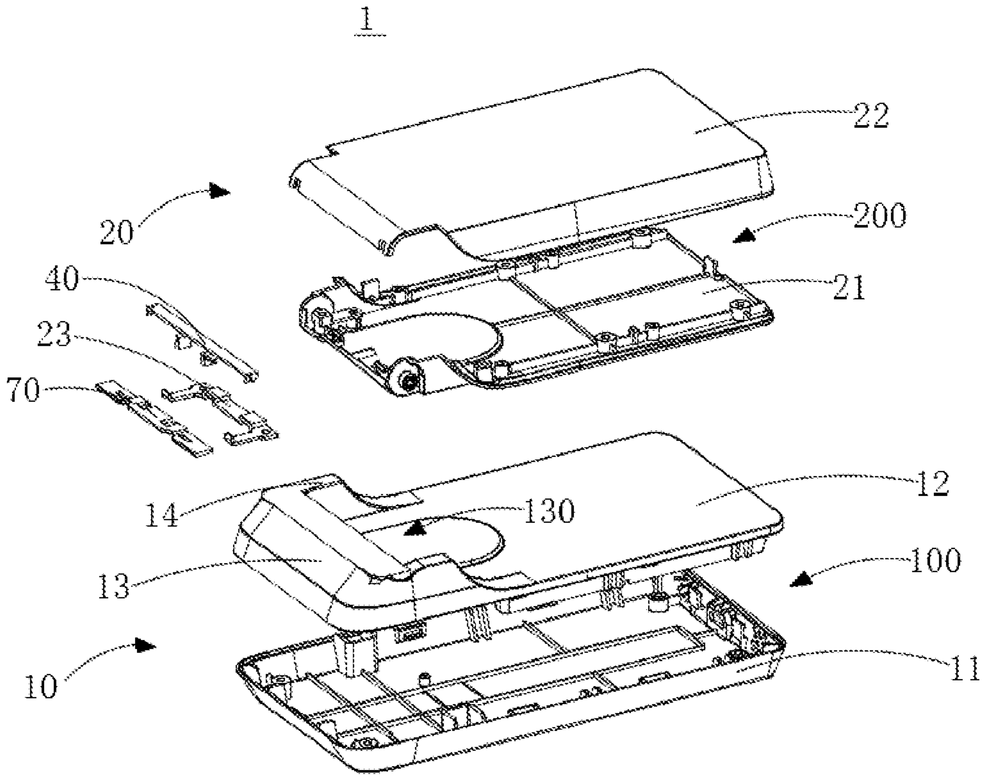
FIG. 6 is an exploded view of a charging device according to an embodiment of the present disclosure.
Figure 7:
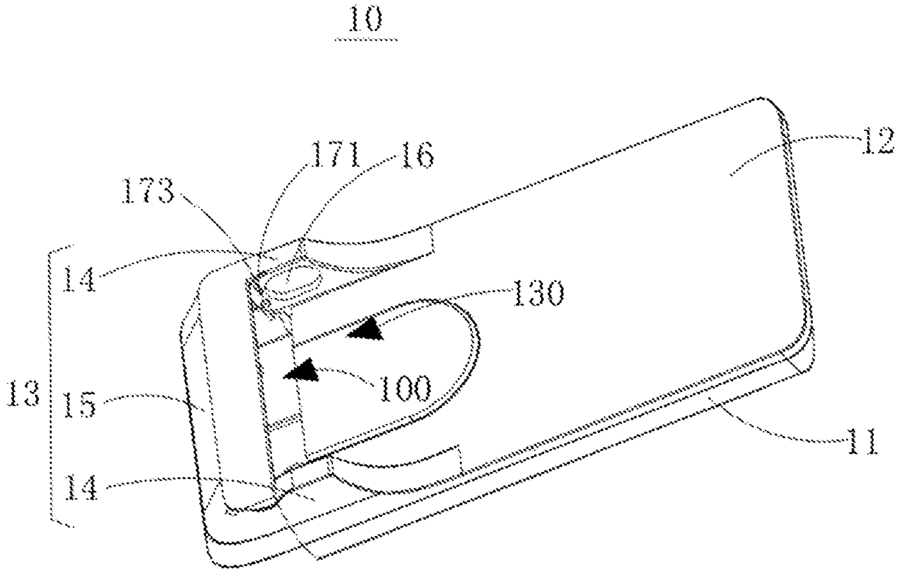
FIG. 7 is a perspective structural diagram of a first housing according to an embodiment of the present disclosure.

In the following, a structure of each component and a matching relationship of a plurality of components provided in the present disclosure are described in detail, for solving the above-mentioned technical problems and achieving the above-mentioned technical effects. The structure of the first housing 10 is first described. With reference to FIG. 6 and FIG. 7, FIG. 6 is an exploded view of a charging device according to an embodiment of the present disclosure, and FIG. 7 is a perspective structural diagram of a first housing according to an embodiment of the present disclosure. In the present embodiment, the first housing 10 includes a first sub-housing 11 and a second sub-housing 12 that are connected to each other, and a first accommodation space 100 is enclosed by the first sub-housing 11 and the second sub-housing 12. The first housing 10 further includes a protruding portion 13 disposed on a side of the second sub-housing 12 facing away from the first sub-housing 11. The protruding portion 13 includes two first side walls 14 opposite to each other, and a second side wall 15 disposed between and connecting the two first side walls 14. A second accommodation space 130 is enclosed by the first side walls 14 and the second side wall 15 and in communication with the first accommodation space 100. The second housing 20 is rotatably connected to the first side walls 14.

In the present embodiment, the first housing 10 is composed of the first sub-housing 11, the second sub-housing 12, and the protruding portion 13, rather than a conventional housing structure. The second sub-housing 12 and the protruding portion 13 may be an integrated structure or separate structures. When the second sub-housing 12 and the protruding portion 13 are of the integrated structure, it can be understood that, the first housing 10 are artificially separated into the second sub-housing 12 and the protruding portion 13, to explain the structural features thereof conveniently and clearly.

In the present embodiment, due to the presence of the protruding portion 13, the first housing 10 has a predetermined protruding structure, which facilitates the transitionally moving and rotating connection of the second housing 20 with the first housing 10. The second accommodation space 130 is enclosed by the two first side walls 14 and the second side wall 15, and the second accommodation space 130 is used to accommodate structural members such as the transmission member 70 and the bracket 40, to provide a mounting space for these components, and to improve appearance performance of the charging device 1. Moreover, the second housing 20 are rotatably and movably connected to the first side wall 14. Optionally, the second housing 20 are rotatably and movably connected to the two first side walls 14, thereby improving rotation performance of the second housing 20.

In addition, the second accommodation space 130 is in communication with the first accommodation space 100, and a motor assembly 50 is subsequently added in the first accommodation space 100 to drive the second housing 20 to rotate, so that a reversed connection space is defined for connecting the second housing 20 to the motor assembly 50.

Figure 8:
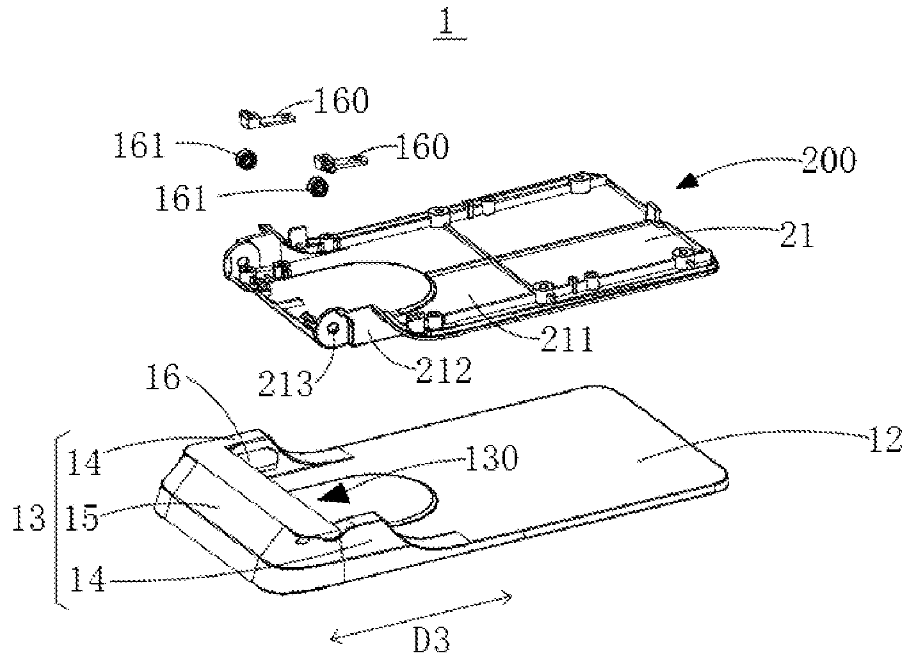
FIG. 8 is an exploded view of a part of a charging device according to an embodiment of the present disclosure.

In the following, with reference to FIG. 6 to FIG. 8, it is described in detail below how the second housing 20 is rotatably and movably connected to the first side walls 14. FIG. 8 is an exploded view of a part of a charging device according to an embodiment of the present disclosure. In the present embodiment, the first side wall 14 has a first rotation groove 16 defined on a side thereof close to the second accommodation space 130. The second housing 20 includes a third sub-housing 21 and a fourth sub-housing 22 that are connected to each other. The third sub-housing 21 is closer to the first sub-housing 22 than the fourth sub-housing 11. A third accommodation space 200 is enclosed by the third sub-housing 21 and the fourth sub-housing 22. The third sub-housing 21 includes a bottom wall 211, and a side wall 212 connected to at least part of a periphery of the bottom wall 211 in a bending manner and having a first through hole 213 disposed thereon. The charging device 1 further includes a first rotation shaft 160. The first rotation shaft 160 has one end disposed in the third accommodation space 200 and connected to the third sub-housing 21, and another end passing through the first through hole 213 and disposed outside the third accommodation space 200 and in the first rotation groove 16.

In the present embodiment, the first rotation groove 16 is defined on the side of the first side wall 14 close to the second accommodation space 130. The second housing 20 includes the third sub-housing 21 and the fourth sub-housing 22. The third sub-housing 21 is closer to the first sub-housing 22 and the second sub-housing 12. Therefore, it can also be understood that the fourth sub-housing 22 may be used for placing and supporting the electronic device assembly 3. The third accommodation space 200 may be used for accommodating structural members such as the first rotation shaft 160 and the charging assembly 30. The third sub-housing 21 includes the bottom wall 211 and the side wall 212 having the first through hole 213. Therefore, the first rotation shaft 160 has one end disposed in the third accommodation space 200 and connected to the third sub-housing 21 by means of screws and the like, and another end passing through the through hole of the side wall 212 and disposed in the first rotation groove 16. In this way, the first rotation groove 16 and the first rotation shaft 160 cooperate with each other to enable the second housing 20 to rotate relative to the first housing 10. In some embodiments, when the first rotation shaft 160 rotates in the first rotation groove 16, since an end of the first rotation shaft 160 is connected to the third sub-housing 21, the third sub-housing 21 is driven by the first rotation shaft 160 to rotate. Similarly, the fourth sub-housing 22 may also be driven by the third sub-housing 21 to rotate.

Optionally, a first bearing 161 is sleeved on the other end of the first rotation shaft 160 and disposed in the first rotating groove 16. The first bearing 161 cooperates with the first rotation shaft 160, which may further improve rotation performance of the first rotation shaft 160.

In addition, further referring to FIG. 7 and FIG. 8, in the embodiment, an extending direction of the first rotation groove 16 is parallel to a moving direction of the second housing 20 (as illustrated in a direction D3 in FIG. 8). In the embodiment, a size of the first rotating groove 16 may be increased in the moving direction on the second housing 20. In this way, the first rotation shaft 160 can not only rotate in the first rotation groove 16, but the first rotation shaft 160 can also move in the first rotation groove 16, to drive the second housing 20 to move relative to the first housing 10. Therefore, in the embodiment, by providing the first rotation groove 16, the second housing 20 can perform two motions, i.e., the movement and rotation relative to the first housing 10.

Figure 9:
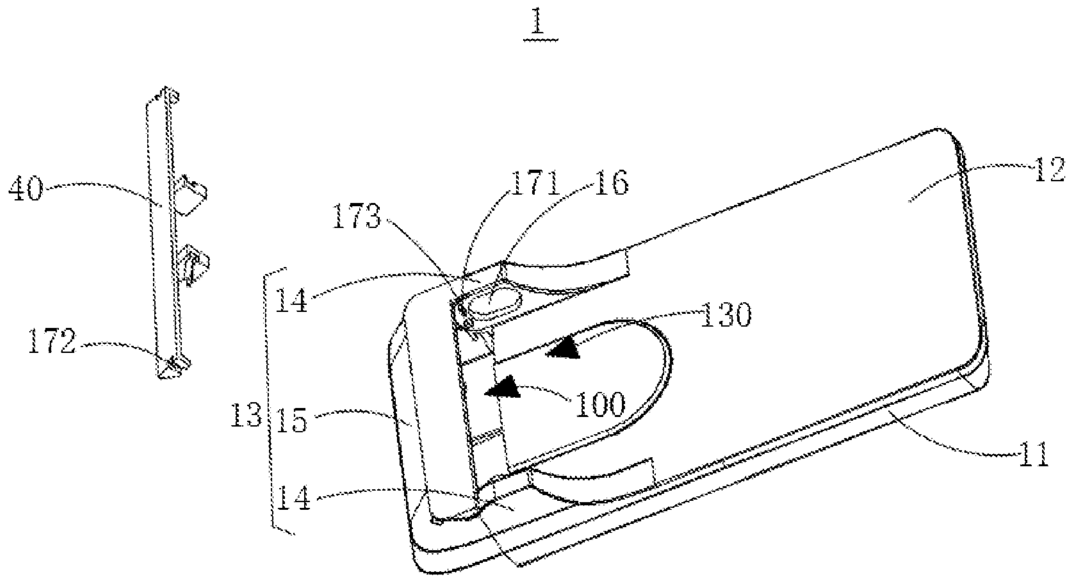
FIG. 9 is an exploded view of a first housing and a bracket according to an embodiment of the present disclosure.

In the following, further referring to FIG. 7 and FIG. 9, it is described in detail how the bracket 40 is movably connected to the first housing 10. FIG. 9 is an exploded view of a first housing and a bracket according to an embodiment of the present disclosure. In the present embodiment, a first movable portion 171 is disposed on a side of the first side wall 14 close to the second accommodation space 130, a second movable portion 172 is disposed on a side of the bracket 40 close to the first side wall 14, and the first movable portion 171 and the second movable portion 172 cooperate with each other to enable the bracket 40 to move relative to the first side wall 14.

In the present embodiment, the first movable portion 171 is disposed on the side of the first side wall 14 close to the second accommodation space 130, the second movable portion 172 is disposed on the side of the bracket 40 close to the first side wall 14, and the first movable portion 171 and the second movable portion 172 cooperate with each other to enable the bracket 40 to move relative to the first side wall 14. Optionally, the first movable portion 171 includes a protruding block or a movable groove, and the second movable portion 172 includes the movable groove or the protruding block. Further, optionally, when the first movable portion 171 is the protruding block, the second movable portion 172 is the movable groove. When the first movable portion 171 is the movable groove, the second movable portion 172 is the protruding block. In the present embodiment, as an example, the first movable portion 171 is the protruding block and the second movable portion 172 is the movable groove for illustration.

Further referring to FIG. 9, in the embodiment, a stop portion 173 is disposed on the side of the first side wall 14 close to the second accommodation space 130. The stop portion 173 is closer to the first sub-housing 11 than the first movable portion 171. In the present embodiment, by additionally providing the stop portion 173, and by arranging the stop portion 173 on a side of the first movable portion 171 close to the first sub-housing 11, i.e., arranging the stop portion 173 on a lower side of the first movable portion 171, the stop portion 173 can prevent the bracket 40 from falling.

Figure 10:
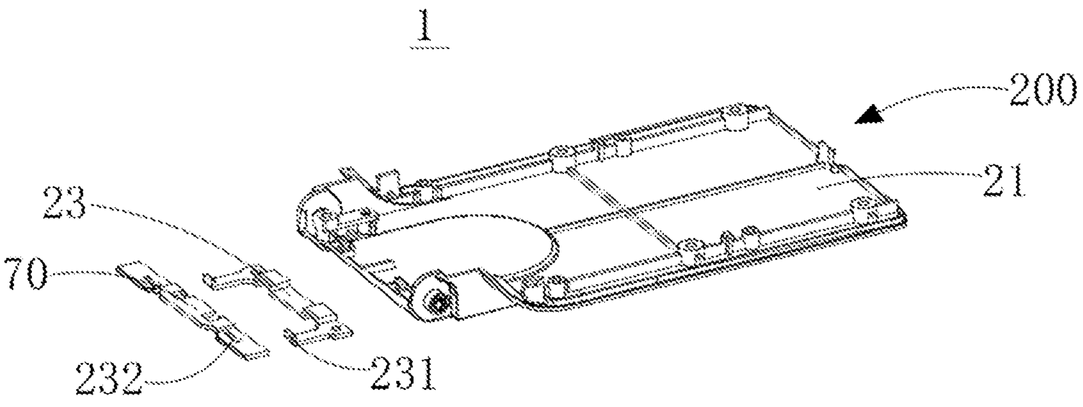
FIG. 10 is an exploded view of a part of a charging device according to another embodiment of the present disclosure.

In the following, according to the present disclosure, it is described in detail how the transmission member 70 is detachably connected to the second housing 20. FIG. 10 is an exploded view of a part of a charging device according to another embodiment of the present disclosure. Referring to FIG. 10, in the present embodiment, the second housing 20 further includes a first connection member 23. An end of the first connection member 23 is connected to the third sub-housing 21, and the other end of the first connection member 23 is detachably connected to the transmission member 70. The transmission member 70 is disposed in the second accommodation space 130. The second housing 20 further includes the first connection member 23. The first connection member 23 has an end connected to the third sub-housing 21 and another end detachably connected to the transmission member 70.

In the present embodiment, the second housing 20 further includes the first connection member 23, and the first connection member 23 is connected to the third sub-housing 21. The third sub-housing 21 and the first connection member 23 may be an integrated structure or separate structures. In the present embodiment, for illustration, the first connection member 23 and the third sub-housing 21 are of the separate structures. The first connection member 23 has an end fixedly connected to the third sub-housing 21, for example, through screws, and another end detachably connected to the transmission member 70.

In addition, a first snap portion 231 is disposed at an end of the first connection member 23 close to the transmission member 70. A second snap portion 232 is disposed on the transmission member 70. The first snap portion 231 and the second snap portion 232 are engaged with each other to enable the first connection member 23 to be detachably connected to the transmission member 70. Optionally, the first snap portion 231 includes a block or a slot, and the second snap portion 232 includes a slot or a block. In the present embodiment, for illustration, the first snap portion 231 is the block, while the second snap portion 232 is the slot. When the first snap portion 231 is in snap-fit engagement with the second snap portion 232, the first connection member 23 can be connected to the transmission member 70, thereby connecting the third sub-housing 21 to the transmission member 70. When the first snap portion 231 is separated from the second snap portion 232, the first connection member 23 is no longer connected to the transmission member 70, thereby enabling the third sub-housing 21 to be separated from the transmission member 70.

Figure 11:
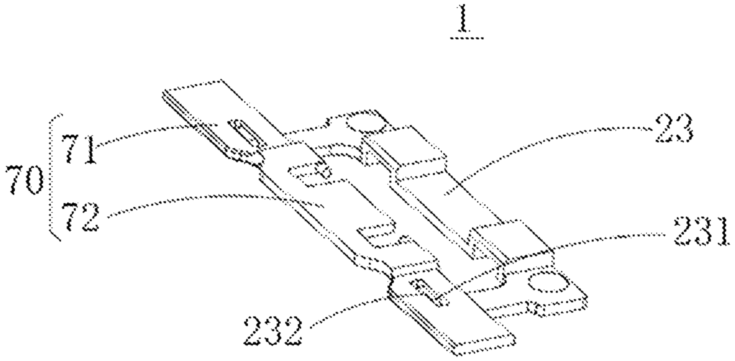
FIG. 11 is a perspective structural diagram of a transmission member and a first connection member according to an embodiment of the present disclosure.

FIG. 11 is a perspective structural diagram of a transmission member and a first connection member according to an embodiment of the present disclosure. Further referring to FIG. 11, in the embodiment, the transmission member 70 includes end portions 71 opposite to each other and a middle portion 72 connecting the end portions 71. The first connection member 23 is connected to the end portions 71. In the present embodiment, the second snap portion 232 is disposed on the end portion 71 of the transmission member 70, thereby enabling the first connection member 23 to be connected to the end portions 71 of the transmission member 70, thereby reducing the difficulty of the first connection member 23 driving the transmission member 70 to move and improving stability of a movement of the transmission member 70.

Figure 12:
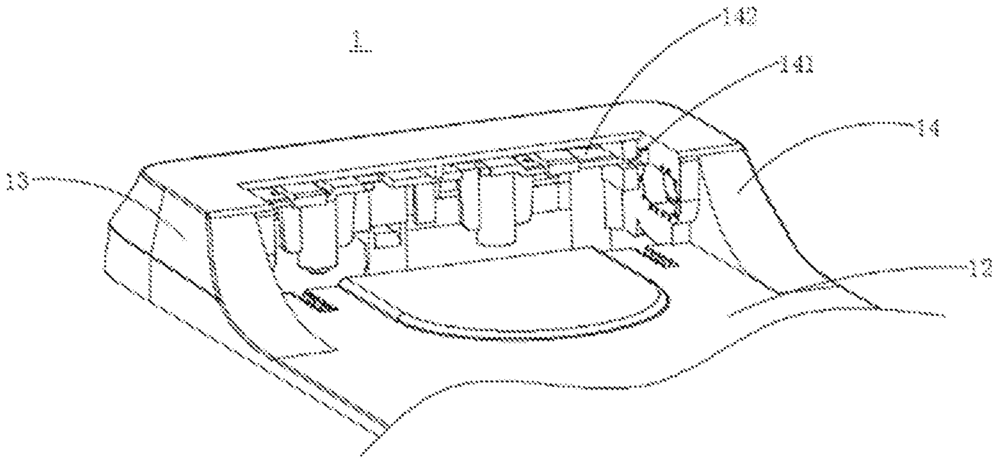
FIG. 12 is a partial perspective structural diagram of a first housing and a transmission member according to an embodiment of the present disclosure.

In the following, in the present disclosure, it is described in detail how a sliding member 52 cooperates with the first housing 10. FIG. 12 is a partial perspective structural diagram of a first housing and a transmission member according to an embodiment of the present disclosure.

Referring to FIG. 12, in the embodiment, a first sliding portion 141 is disposed on a side of the first side wall 14 close to the second accommodation space 130, and a second sliding portion 142 is disposed on a side of the transmission member 70 close to the first side wall 40. The first sliding portion 141 and the second sliding portion 142 cooperate with each other to enable the transmission member 70 to slide on the first housing 10.

In the present embodiment, the first sliding portion 141 is disposed on the side of the first side wall 14 close to the second accommodation space 130, the second sliding portion 142 is disposed on the side of the transmission member 70 close to the first side wall 40, and the first sliding portion 141 and the second sliding portion 142 cooperate with each other, enabling the transmission member 70 to slide on the first housing 10. Optionally, the first sliding portion 141 is a sliding groove 525 or a sliding block 524, and the second sliding portion 142 is the sliding block 524 or the sliding groove 525. In the present embodiment, for illustration, the first sliding portion 141 is the sliding groove 525, and the second sliding portion 142 is the sliding block 524.

In addition, when the transmission member 70 slides under cooperation of the first sliding portion 141 and the second sliding portion 142, the first sliding portion 141 and the second sliding portion 142 can also limit the transmission member 70 in a direction parallel to the movement of the bracket 40 to prevent the transmission member 70 from falling, thereby improving sliding performance and stability performance of the transmission member 70.

Optionally, the first sliding portion 141 includes the sliding groove 525, and the second sliding portion 142 includes the sliding block 524. In the fallback state of the charging device 1, the sliding block 524 is partially disposed in the sliding groove 525.

In view of the above, in a process that the charging device 1 is switched to the fallback state from the initial state, the second housing 20 moves backwards relative to the first housing 10, such that the first connection member 23 is driven to move backwards, and the transmission member 70 is driven through a movement of the first connection member to move. Moreover, when the charging device 1 is in the fallback state, the second housing 20 stops moving, and thus the transmission member 70 also stops moving. In this case, a part of the sliding block 524 may be located in the sliding groove 525, such that the cooperation between the first sliding portion 141 and the second sliding portion 142 can be still used to limit the transmission member 70 and prevent the transmission member 70 from dropping.

Figure 13:
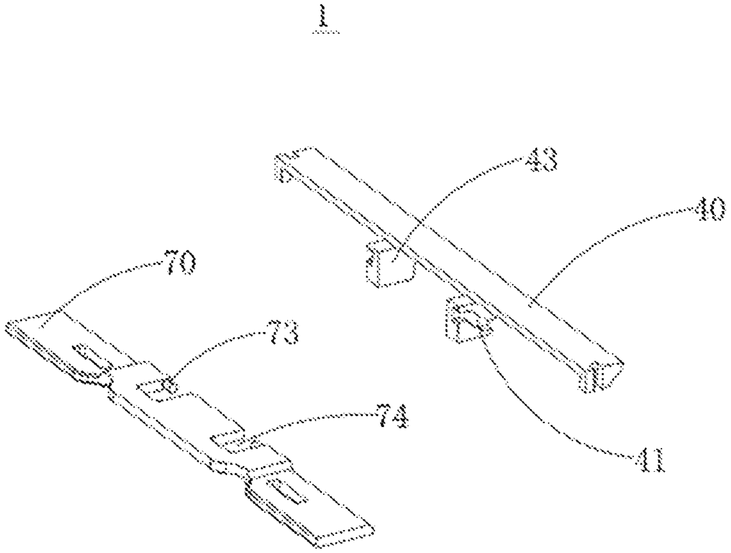
FIG. 13 is a perspective structural diagram of a transmission member and a bracket according to an embodiment of the present disclosure.
Figure 14:
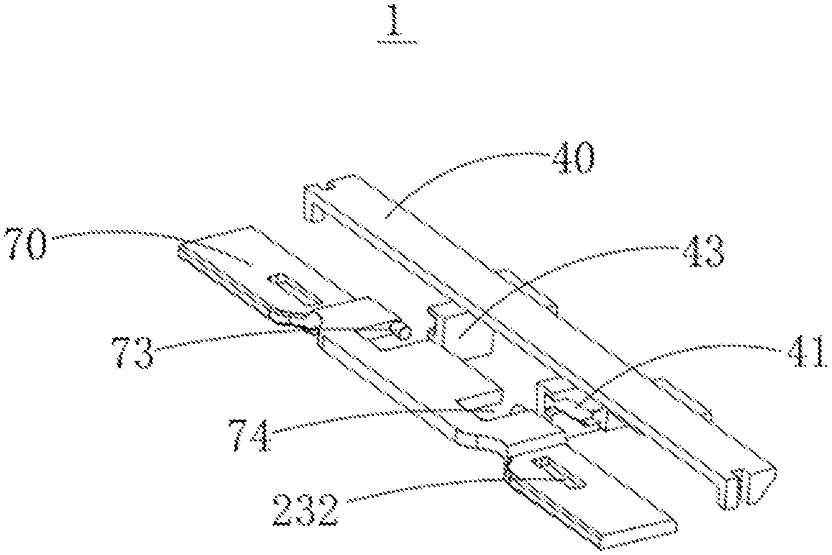
FIG. 14 is a perspective structural diagram of a transmission member and a bracket when a charging device is in an initial state according to an embodiment of the present disclosure.
Figure 15:
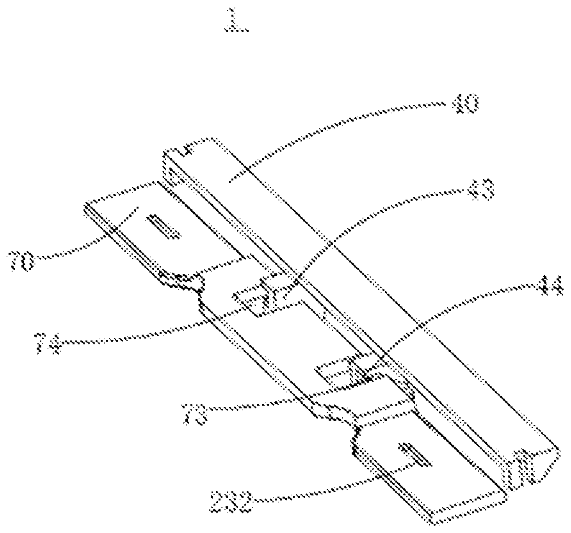
FIG. 15 is a perspective structural diagram of a transmission member and a bracket when a charging device is between an initial state and a fallback state according to an embodiment of the present disclosure.
Figure 16:
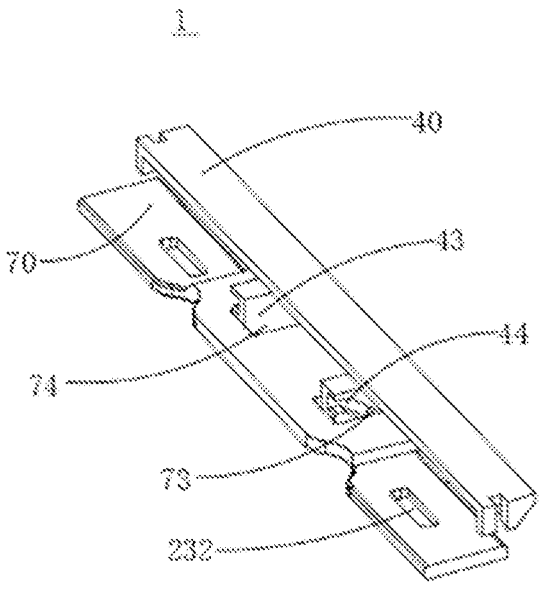
FIG. 16 is a perspective structural diagram of a transmission member and a bracket when a charging device is in a fallback state according to an embodiment of the present disclosure.

In the following, according to the present disclosure, it is described in detail how the transmission member 70 cooperates with the bracket 40 and moves. FIG. 13 is a perspective structural diagram of a transmission member and a bracket according to an embodiment of the present disclosure. FIG. 14 is a perspective structural diagram of a transmission member and a bracket when a charging device is in an initial state according to an embodiment of the present disclosure. FIG. 15 is a perspective structural diagram of a transmission member and a bracket when a charging device is between an initial state and a fallback state according to an embodiment of the present disclosure. FIG. 16 is a perspective structural diagram of a transmission member and a bracket when a charging device is in a fallback state according to an embodiment of the present disclosure. Referring to FIG. 13 to FIG. 16, in the embodiment, a guide rod 73 is disposed on a side of the transmission member 70 close to the third sub-housing 21. A guide groove 42 is defined on a side of the bracket 40 facing away from the third sub-housing 21. The guide rod 73 cooperates with the guide groove 42 to enable the bracket 40 to move when the transmission member 70 is connected to the bracket 40 and driven by the second housing 20 to move.

In some embodiments, FIG. 14 can be regarded as a schematic structural diagram of the transmission member 70 and the bracket 40 when the charging device 1 in FIG. 1 is in the initial state. In this case, the guide rod 73 does not enter the guide groove 42 yet. FIG. 15 can be regarded as a moment in the process that the charging device 1 is switched to the fallback state from the initial state, i.e., a moment in the process from the state illustrated in FIG. 1 to the state illustrated in FIG. 3, and at this moment, the guide rod 73 just enters the guide groove 42. FIG. 16 is a schematic structural diagram of the transmission member 70 and the bracket 40 when the charging device 1 in FIG. 3 is in the fallback state.

In the present embodiment, the guide rod 73 is disposed on the side of the transmission member 70 close to the third sub-housing 21, and the guide groove 42 is defined on a side of the bracket 40 facing away from the third sub-housing 21. In this way, when the transmission member 70 moves, the guide rod 73 can enter the guide groove 42. When the transmission member 70 continues to move under the action of the first connection member 23, the guide rod 73 can exert acting force on the guide groove 42 of the bracket 40. The bracket tends to move after the guide groove 42 is subjected to the acting force. Therefore, the first movable portion 171 can cooperate with the second movable portion 172 to enable the bracket 40 to move, thereby achieving the switching between the protruding state and the received state.

Optionally, further referring to FIG. 14, in the embodiment, in the initial state of the charging device 1, the guide rod 73 is disposed in the guide groove 42 or outside the guide groove 42.

As described above, when the charging device 1 is in the initial state, the transmission member 70 is not connected to the bracket 40, and a gap is defined between the transmission member 70 and the bracket 40. It can also be understood that, in this case, the guide rod 73 is disposed outside the guide groove 42, so that the movement of the transmission member 70 has no impact on a position of the bracket 40. In addition, only when the transmission member 70 moves and is connected to the bracket 40, i.e., after the guide rod 73 enters the guide groove 42, the movement of the transmission member 70 will affect a motion state of the bracket 40.

Further referring to FIG. 13, in the embodiment, the bracket 40 includes a body and a guide portion 43 connected to the body. The body is further from the first sub-housing 11 than the guide portion 43. The guide groove 42 is defined on a side of the guide portion 43 facing away from the third sub-housing 21. An avoidance groove 74 is defined on the side of the transmission member 70 close to the third sub-housing 21. The avoidance groove 74 is used to receive the guide portion 43, and the guide rod 73 is disposed on a groove wall of the avoidance groove 74 defined on the transmission member 70.

With regard to a specific structure of the bracket 40, the bracket 40 may include the body and the guide portion 43. The guide portion 43 is close to the first sub-housing 11, which may also be understood as that the guide portion 43 is disposed below the body, and the guide groove 42 is disposed on the guide portion 43. In addition, the avoidance groove 74 is defined on the side of the transmission member 70 close to the third sub-housing 21 and is used to receive the guide portion 43 to prevent the transmission member 70 from abutting against the guide portion during movement, which may hinder the further movement of the transmission member 70. The guide rod 73 may be disposed on the groove wall of the avoidance groove 74. Therefore, a size of the avoidance groove 74 and a size of the guide portion 43 affect a distance travelled by the transmission member 70 after being in contact with the bracket 40.

Further referring to FIG. 6 and FIG. 13 to FIG. 16, in the embodiment, a side of the guide groove 42 close to the third sub-housing 21 is closer to the first sub-housing 11 than a side of the guide groove 42 away from the third sub-housing 21.

In the present embodiment, the bracket 40 is disposed on a side (for example, a right side) of the third sub-housing 21 and on a side (such as an upper side) of the first sub-housing 11. It can also be understood that a height of the guide groove 42 close to a side of the transmission member 70 is greater, and the height of the guide groove 42 away from a side of the transmission member 70 is smaller. That is, the guide groove 42 continuously extends downwards in a direction from a side close to the transmission member 70 to a side away from the transmission member 70 (towards the first sub-housing 11).

In this way, when the second housing 20 moves relative to the first housing 10, i.e., when the second housing 20 moves backwards relative to the first housing 10, and after the guide rod 73 enters the guide groove 42, the guide rod 73 tends to move downwards. Therefore, the guide rod 73 can provide a reaction force to the bracket 40, enabling the bracket 40 to have an upward moving trend and to move upwards to reach the protruding state. Similarly, a reverse process can be understood in the similar way. That is, when the second housing 20 moves relative to the first housing 10, i.e., when the second housing 20 moves forwards relative to the first housing 10, and after the guide rod 73 enters the guide groove 42, the guide rod 73 tends to move upwards, and thus the guide rod 73 can provide the reaction force to the bracket 40, enabling the bracket 40 to have a downward moving trend and to move downwards to reach the received state.

Optionally, referring to FIG. 13 again, in the embodiment, the guide groove 42 is in a linear shape. In the present embodiment, the guide groove 42 is designed to be in the linear shape. In this way, every time when the guide rod 73 moves for a first distance, the bracket moves for a second distance, thereby improving movement uniformity of the bracket 40.

In the following, the protruding state and the received state of the bracket 40 are described in detail according to the present disclosure. In view of the above, the protruding state of the bracket 40 includes two positional forms: one is that the bracket 40 protrudes from the first housing 10, and the other is that the bracket 40 is flush with the first housing 10. The bracket 40 protruding from the first housing 10 means that a side surface of the bracket 40 facing away from the first sub-housing 11 is higher than a side surface of the protruding portion 13 facing away from the first sub-housing 11. The bracket 40 being flush with the first housing 10 means that the side surface of the bracket 40 facing away from the first sub-housing 11 is flush with the side surface of the protruding portion 13 facing away from the first sub-housing 11. Therefore, the bracket 40 can be switched between the received state and the protruding state in two manners, one of which is that the bracket 40 is received in or is flush with the first housing 10, and the other one of which is that the bracket 40 is received in or protrudes from the first housing 10.

In the present embodiment, the bracket 40 can be in the received state in two manners, one of which is that the bracket 40 is received in the first housing 10, and the other one of which is that the bracket 40 is flush with the first housing 10. A position of the bracket 40 in the received state is different from a position of the bracket 40 in the protruding state. The bracket 40 being received in the first housing 10 means that the side surface of the bracket 40 facing away from the first sub-housing 11 is lower than the side surface of the protruding portion 13 facing away from the first sub-housing 11. In this way, the bracket 40 can be switched between the received state and the protruding state in three manners. In addition to the two manners mentioned above, the third manner is between the manner that the bracket 40 is flush with the first housing 10 and the manner that the bracket 40 protrudes from the first housing 10. In some embodiments, two specific structures of the bracket 40 in the received state are illustrated below.

Referring to FIG. 2 again, in the present embodiment, a sealing portion 220 is disposed on a side of the fourth sub-housing 22 close to the protruding portion 13. In the initial state of the charging device 1, the sealing portion 220 abuts against the protruding portion 13, and the bracket 40 is closer to the first sub-housing 11 than the sealing portion 220.

In the present embodiment, the sealing portion 220 abuts against the protruding portion 13, such that the bracket 40 can be in the first housing 10 when the charging device 1 is in the initial state. In this way, in the initial state of the charging device 1, a user cannot see the bracket 40. Only when the second housing 20 moves relative to the first housing 10, the bracket 40 upraise, thereby reducing cracks on the surface of the charging device 1 and improving sealing performance. In addition, the appearance performance of the charging device 1 and a user experience can be improved.

In addition, under this structure, when the transmission member 70 is in the initial state, a predetermined space between the transmission member 70 and the bracket 40 is required, in order to ensure that the second housing 20 has moved a predetermined distance when the transmission member 70 is connected to the bracket 40, thereby enabling a predetermined movement space for the bracket 40 to rise is defined between the second housing 20 and the protruding portion 13.

Figure 17:
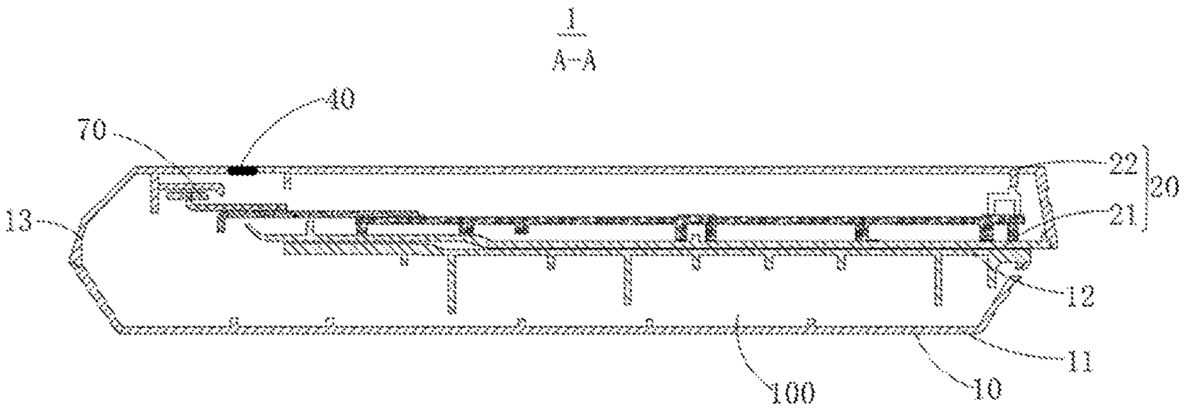
FIG. 17 is a schematic cross-sectional view along A-A direction as illustrated in FIG. 1 according to another embodiment of the present disclosure.

FIG. 17 is a schematic cross-sectional view along A-A direction as illustrated in FIG. 1 according to another embodiment of the present disclosure. Referring to FIG. 17, in the embodiment, in the initial state of the charging device 1, the side surface of the protruding portion 13 facing away from the first sub-housing 11, the side surface of the bracket 40 facing away from the first sub-housing 11, and a side surface of the fourth sub-housing 22 facing away from the first sub-housing 11 are all flush with each other.

In the present embodiment, when the charging device 1 is in the initial state, the bracket 40 may be flush with the first housing 10, which may reduce the size of the second housing 20 and an uprising distance of the bracket 40 to enable the bracket 40 to extend more easily.

In addition, under the structure, the transmission member 70 in the initial state may be directly connected to the bracket 40, or a predetermined space between the transmission member 70 and the bracket 40 is defined, which is not limited in the embodiment.

Optionally, the charging device 1 further includes an anti-slip member 44 disposed on the side of the bracket 40 facing away from the first sub-housing 11. A high friction coefficient of the anti-slip member 44 may be used for improving a limiting capability of the bracket 40 to the electronic device assembly 3.

In the present disclosure, the structure of the charging device 1 in the initial state and the structure of the charging device 1 in the fallback state is described above, and it is also described in detail how the bracket 40 is specifically moveable along with the rotation of the second housing 20. In addition to the initial state and the fallback state, the charging device 1 further has a vertical state. When the charging device 1 is switched to the vertical state from the fallback state, a position of the bracket 40 relative to the first housing 10 remains unchanged. The vertical state is a state in which the second housing 20 and the first housing 10 define an included angle.

When the charging device 1 is in the fallback state, the bracket 40 has been in the protruding state. In the present embodiment, when the charging device 1 is switched to the vertical state from the fallback state, the position of the bracket 40 relative to the first housing 10 remains unchanged, to maintain the position of the bracket 40, thereby enabling the position of the bracket 40 relative to the first housing 10 to be fixed.

Optionally, when the charging device 1 is switched to the vertical state from the fallback state, the transmission member 70 is separated from the second housing 20. In order to ensure that the position of the bracket 40 relative to the first housing 10 remains unchanged when the charging device 1 is switched to the vertical state from the fallback state, in the embodiment, the transmission member 70 is separated from the second housing 20. In this way, after the second housing 20 is separated from the transmission member 70, the rotation of the second housing 20 has no impact on a motion state of the transmission member 70 and the motion state of the bracket 40.

Figure 18:
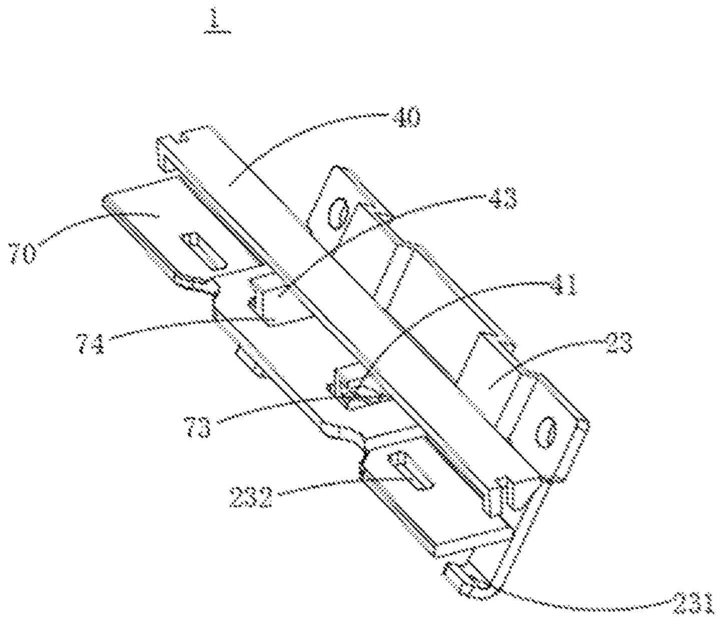
FIG. 18 is a schematic structural diagram of a transmission member, a bracket, and a first connection member according to an embodiment of the present disclosure.

FIG. 18 is a schematic structural diagram of a transmission member, a bracket, and a first connection member according to an embodiment of the present disclosure. In the present embodiment, referring to FIG. 18, the first snap portion 231 is disposed at the end of the first connection member 23 close to the transmission member 70, and the second snap portion 232 is disposed on the transmission member 70. The first snap portion 231 and the second snap portion 232 cooperate with each other. In this way, the first snap portion 231 can be in a snap-fit connection with the second snap portion 232 in the horizontal state of the charging device 1, and the first snap portion 231 can be separated from the second snap portion 232 in the vertical state of the charging device 1.

It can be seen from the above contents, the transmission member 70 is detachably connected to the first connection member 23 by means of cooperation of the first snap portion 231 and the second snap portion 232. Throughout the horizontal state, i.e., in the initial state and the fallback state, the first snap portion 231 and the second snap portion 232 are in the snap-fit connection, enabling the second housing 20 to be connected to the transmission member 70. In this way, during the rotation of the second housing 20, the transmission member 70 may be driven to move, so as to drive the bracket 40 to move. When the charging device 1 is switched from the horizontal state to the vertical state, as long as the second housing 20 is turned over, the first connection member 23 may be driven to turn over. In this case, the second snap portion 232 is separated from the first snap portion 231, thereby separating the second housing 20 from the transmission member 70. As the second housing 20 continues to rotate, the first snap portion 231 and the second snap portion 232 move away, so that the rotation of the second housing 20 has no influence on the motion of the transmission member 70. In this case, the transmission member 70 and the bracket 40 are both in the static state.

Referring to FIG. 2 again, in the embodiment, in the horizontal state of the charging device 1, the first connection member 23 is closer to the first sub-housing 11 than the transmission member 70.

When the second housing 20 is switched from the horizontal state to the vertical state, the second housing 20 rotates in a counterclockwise direction. Therefore, in the embodiment, the first connection member 23 may be disposed on a lower side of the transmission member 70, such that the first connection member 23 can easily separate from the transmission member 70 when the second housing 20 rotates.

Figure 19:
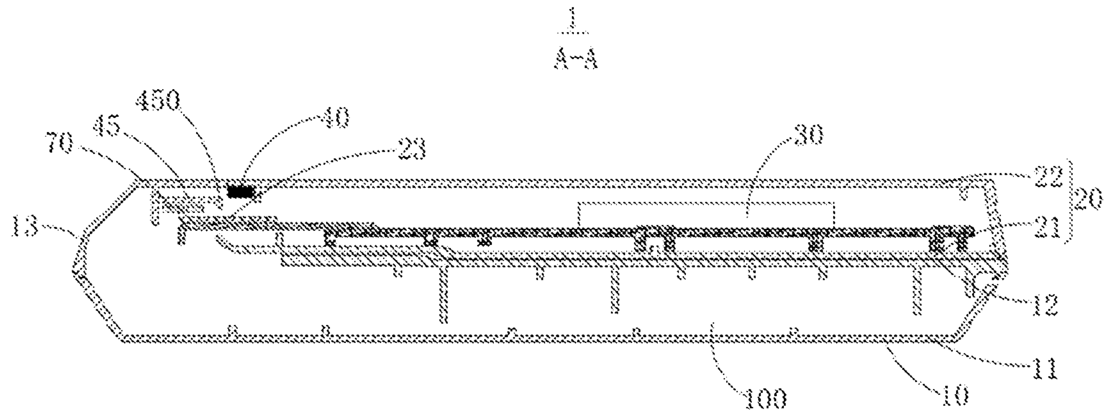
FIG. 19 is a schematic cross-sectional view along A-A direction as illustrated in FIG. 1 according to another embodiment of the present disclosure.
Figure 20:
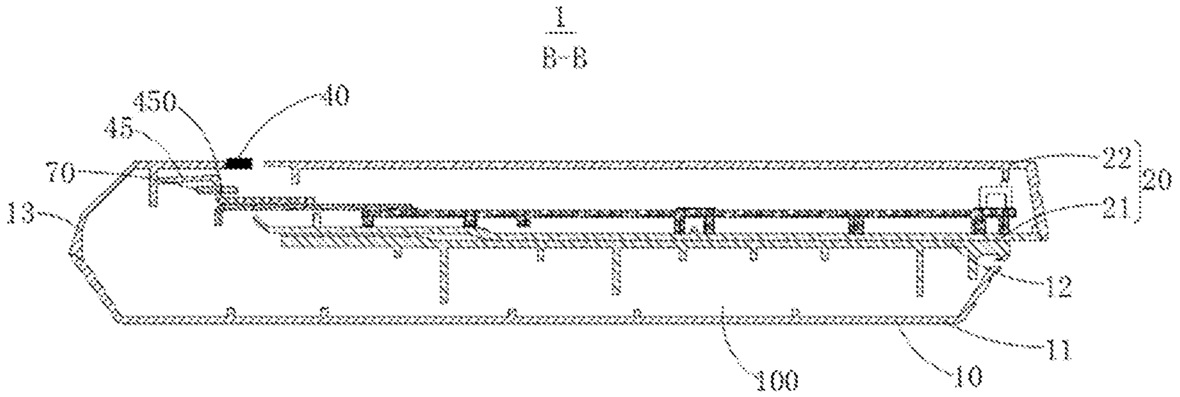
FIG. 20 is a schematic cross-sectional view along B-B direction as illustrated in FIG. 2 according to yet another embodiment of the present disclosure.
Figure 21:
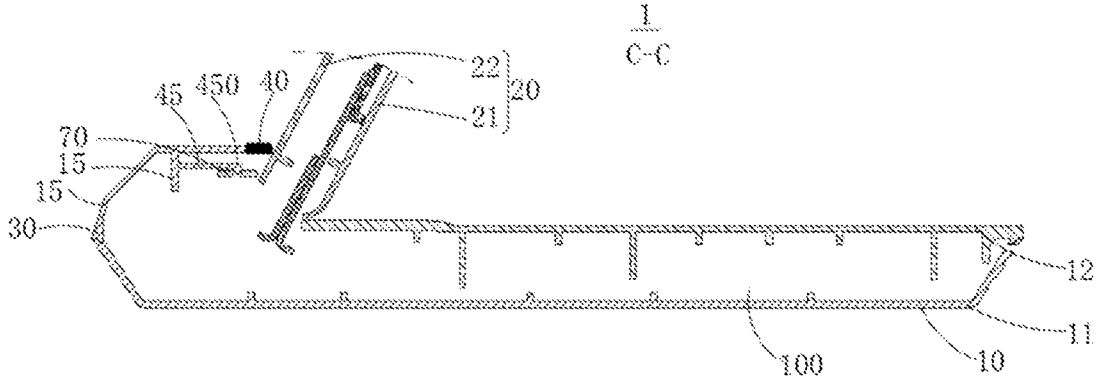
FIG. 21 is a schematic cross-sectional view along a C-C direction as illustrated in FIG. 3 according to an embodiment of the present disclosure.

FIG. 19 is a schematic cross-sectional view along A-A direction as illustrated in FIG. 1 according to another embodiment of the present disclosure. FIG. 20 is a schematic cross-sectional view along B-B direction as illustrated in FIG. 2 according to yet another embodiment of the present disclosure. FIG. 21 is a schematic cross-sectional view along a C-C direction as illustrated in FIG. 3 according to an embodiment of the present disclosure. Referring to FIG. 19 to FIG. 21, in the embodiment, the charging device 1 further includes a limiting member 45 disposed in the second accommodation space 130 and connected to the second side wall 15. A third snap portion 450 is disposed on a side of the limiting member 45 facing away from the second side wall 15. In the vertical state of the charging device 1, the first snap portion 231 is separated from the second snap portion 232, and the second snap portion 232 is in a snap-fit connection with the third snap portion 450.

As can be seen from the above contents, when the charging device 1 is switched to the fallback state from the initial state, the transmission member 70 is always connected to the second housing 20 through the first connection member 23. When the charging device 1 is switched to the vertical state from the fallback state, the transmission member 70 is separated from the first connection member 23. Therefore, after the transmission member 70 is separated from the first connection member 23, when the charging device 1 is subjected to a great external force, the transmission member 70 may have a predetermined displacement to have a falling risk, which may further cause the falling of the bracket 40. At the same time, once the transmission member 70 is displaced, when the second housing 20 falls back, the first snap portion 231 of the first connection member 23 cannot be in snap-fit engagement with the second snap portion 232, thereby driving the transmission member 70 and the bracket 40 to move.

In order to solve the above problems, the limiting member 45 is added in the present disclosure, and the limiting member 45 is disposed in the second accommodation space 130 and connected to the second side wall 15. The third snap portion 450 is disposed on the side of the limiting member 45 facing away from the second side wall 15. In the vertical state of the charging device 1, the first snap portion 231 is separated from the second snap portion 232, and the second snap portion 232 is in a snap-fit connection with the third snap portion 450. In this way, when the charging device 1 is in the horizontal state, the transmission member 70 is connected and limited by means of the first connection member 23. When the charging device 1 is in the vertical state, the transmission member 70 is connected and limited by means of the limiting member 45. Optionally, the limiting member 45 has elasticity.

In some embodiments, as illustrated in FIG. 19, when the charging device 1 is in the initial state, the first snap portion 231 is in the snap-fit connection with the second snap portion 232, and a predetermined space between the third snap portion 450 and the second snap portion 232 is defined. As illustrated in FIG. 20, when the charging device 1 is in the fallback state, the first connection member 23 drives the transmission member 70 to move backwards, enabling the third snap portion 450 to be directly opposite to the second snap portion 232. However, in this case, since the second snap portion 232 is still in the snap-fit engagement with the first snap portion 231, the third snap portion 450 is not engaged with the second snap portion 232 yet. As illustrated in FIG. 21, when the charging device 1 is in the vertical state, the second housing 20 rotates, the first snap portion 231 is separated from the second snap portion 232, and the third snap portion 450 is engaged with the second snap portion 232, thereby achieving a seamless connection of the transmission member 70 and improving the stability of the transmission member 70.

Optionally, referring to FIG. 19 to FIG. 21 again, in the embodiment, in the protruding state of the bracket 40, the bracket 40 protrudes from the first housing 10 on the second surface 102.

The first housing 10 has the first surface 101, the second surface 102, and the third surface 103. The first surface 101 can be regarded as the lower surface of the first housing 10, and the second surface 102 can be regarded as the upper surface of the first housing 10. The second surface 102 herein is not formed by a component but formed by the second sub-housing 12 and the protruding portion 13. The third surface 103 can be regarded as a side surface of the first housing 10. In the present embodiment, when the bracket 40 is in the protruding state, the bracket 40 protrudes from the second surface 102 of the first housing 10 instead of from the first surface 101 or the third surface 103. The electronic device assembly 3 in the horizontal state is placed on the fourth sub-housing 22, such that the bracket 40 protrudes from the second surface 102 of the protruding portion 13. The electronic device assembly 3 can be more conveniently abutted against the bracket 40, thereby simplifying the structure of the charging device 1 and reducing the size of the charging device 1.

It can be seen from the above that the second housing 20 may be moveable and rotatable relative to the first housing 10. In the following, according to the present disclosure, it is described in detail how to enable the second housing 20 to move and rotate relative to the first housing 10. Referring to FIG. 2 again, in the embodiment, the charging device 1 further includes the motor assembly 50 disposed in the first accommodation space 100. The motor assembly 50 is connected to the second housing 20 and is capable of driving the second housing 20 to move and rotate relative to the first housing 10.

In the present embodiment, by adding the motor assembly 50 and connecting the motor assembly 50 to the second housing 20, the motor assembly 50 during working may drive the second housing 20 to move and rotate relative to the first housing 10.

Figure 22:
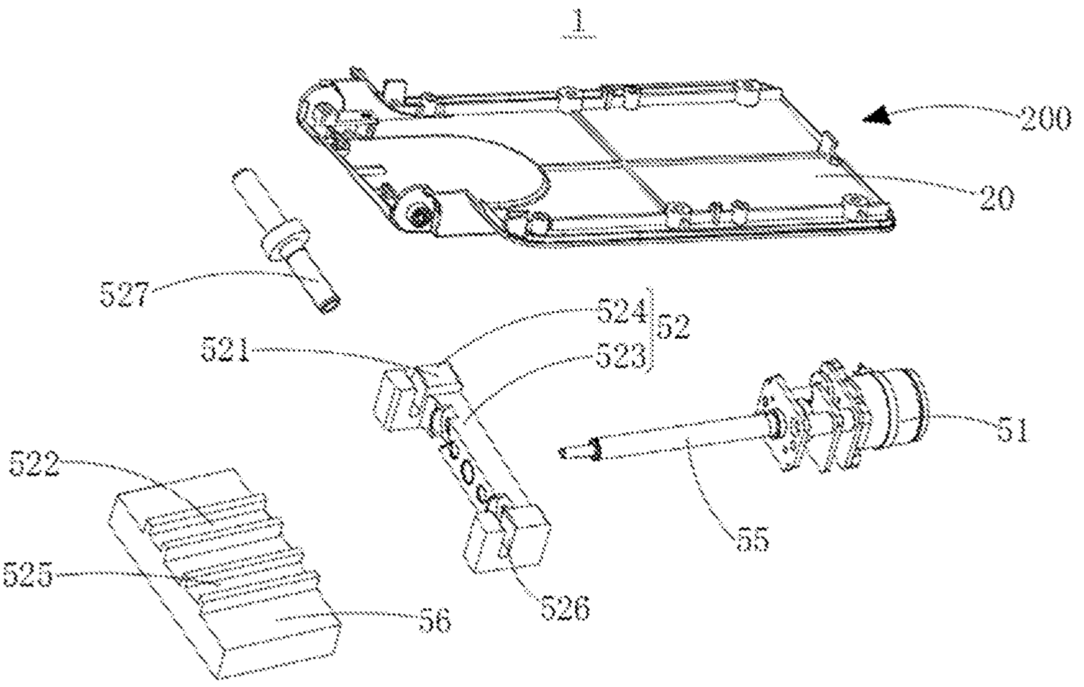
FIG. 22 is an exploded view of a part of a charging device according to yet another embodiment of the present disclosure.

FIG. 22 is an exploded view of a part of a charging device according to yet another embodiment of the present disclosure. Referring to FIG. 22, in the embodiment, the motor assembly 50 includes a motor 51, a screw rod 55 connected to the motor 51, a sliding member 52 sleeved on the screw rod 55 and connected to the screw rod 55 through threads, and a fourth sliding portion 522. A third sliding portion 521 is disposed on the sliding member 52. The third sliding portion 521 and the fourth sliding portion 522 cooperate with each other to enable the sliding member 52 to slide on the screw rod 55 when the motor 51 operates.

A third rotation groove 526 is defined on a side of the sliding member 52 close to the second sub-housing 12. The charging device 1 further includes a third rotation shaft 527. The third rotation shaft 527 has an end connected to the second housing 20 and another end disposed in the third rotation groove 526.

In the present embodiment, the sliding member 52 may slide through cooperation of the motor 51, the screw rod 55, and the sliding member 52. In some embodiments, the screw rod 55 may be connected to the motor 51, and the sliding member 52 is sleeved on the screw rod 55. The motor 51 may drive the screw rod 55 to rotate jointly during working, so as to drive the sliding member 52 to rotate. In addition, in order to slide the sliding member 52 instead of rotating, the embodiment may provide the third sliding portion 521 on the sliding member 52 and cooperate the third sliding portion 521 with the fourth sliding portion 522 connected to the first housing 10, to convert a rotary motion of the sliding member 52 driven by the screw rod 55 into a sliding motion. It may also be understood that the third sliding portion 521 and the fourth sliding portion 522 cooperate with each other to achieve a guiding function and convert a rotation force of the screw rod 55 into a sliding force, thereby driving the sliding member 52 to slide.

Optionally, a threaded hole is disposed on the sliding member 52, the thread is disposed on a surface of the screw rod 55, and the sliding member 52 is in threaded connection with the screw rod 55 through the threaded hole. In the present embodiment, the sliding member 52 may be connected to the screw rod 55 through the threaded hole and threads. In addition, since the screw rod 55 and the sliding member 52 that are connected with each other through threads have predetermined self-locking performance, when the charging device 1 is in the vertical state, i.e., after the second housing 20 is rotated and upraised, it can prevent a weight of the second housing 20, a weight of the electronic device assembly placed on the second housing 20, or other external impact forces from causing reverse rotation of the motor 51 and enabling the second housing 20 to drop, thereby improving security of the charging device 1.

In addition, the third rotation groove 526 is defined on the side of the sliding member 52 close to the second sub-housing 12. The third rotation shaft 527 has an end connected to the second housing 20 and another end disposed in the third rotation groove 526. In this case, the second housing 20 is connected to the sliding member 52 through the third rotation shaft 527. When the motor 51 operates and drives the sliding member 52 to slide, the second housing 20 may be driven to slide in the first rotation groove 16 relative to the first housing 10 through the third rotation shaft 527.

In addition, the third rotation groove 526 extends towards the first sub-housing 11. In the present embodiment, the third rotation groove 526 extends towards a direction of the first housing 10. In this way, when the second housing 20 moves relative to the first housing 10 in the first rotation groove 16, to the end i.e., when the first rotation shaft 160 abuts against the groove wall of the first rotation groove 16, the sliding member 52 continues to slide under the driving of the motor 51, but the second housing 20 cannot further slide. Therefore, the third rotation shaft 527 slides towards a direction close to the first sub-housing 11 in the third rotation groove 526, and slides in a direction parallel to the first sub-housing 11 under the driving of the sliding member 52, so that the second housing 20 may rotate relative to the first housing 10 under the comprehensive cooperation of the two motions.

In the present disclosure, a charging device 1 having a special structure is designed, in which only one motor 51 is required to drive the second housing 20 to move and rotate relative to the first housing 10. The specific process is as follows. When the charging device 1 is switched to the fallback state from the initial state, the motor 51 starts to operate and drives the sliding block 524 to slide through the screw rod 55, so as to drive the second housing 20 to move relative to the first housing 10. When the charging device 1 is in the fallback state, the first rotation shaft 160 abuts against the first side wall 14 to form the groove wall of the first rotation groove 16. When the charging device 1 is switched from the fallback state to the initial state, the sliding block 524 continues to slide, to drive another end of the third rotation shaft 527 to slide in the third rotation groove 526, thereby driving the second housing 20 to rotate relative to the first housing 10.

The present disclosure introduces two manners of cooperation between the third sliding portion 521 and the fourth sliding portion 522 to enable the sliding member 52 to slide, i.e., cooperative guiding of the sliding block 524 and the sliding groove 525 and the cooperative guiding of the guide rod 57.

Further referring to FIG. 22, in the embodiment, the motor assembly 50 further includes a support member 56 connected to the first sub-housing 11. The sliding groove 525 is defined on the side of the support member 56 facing away from the first sub-housing 11. The sliding block 524 is disposed on the side of the sliding member 52 close to the support member 56. The sliding block 524 is slidable in the sliding groove 525.

In the present embodiment, for the first manner of cooperative guiding of the sliding block 524 and the sliding groove 525, the support member 56 may be additionally disposed on the first sub-housing 11, and the fourth sliding portion 522 is disposed on a side of the support member 56 facing away from the bottom wall 211. It can also be understood that the support member 56 and the first sub-housing 11 are of the separate structures. The fourth sliding portion 522 is disposed on the support member 56, and the support member 56 is disposed on the first sub-housing 11, which may reduce the preparing difficulty of the first sub-housing 11.

In addition, the sliding member 52 includes a connection portion 523 and a sliding block 524 protruding from two opposite ends of the connection portion 523. The connection portion 523 is sleeved on the screw rod 55. A sliding groove 525 is disposed on a side of the support member 56 facing away from the first sub-housing 11. The sliding block 524 and the sliding groove 525 cooperate with each other to slide the sliding member 52.

On the basis of the support member 56, the sliding member 52 includes the connection portion 523 and the sliding block 524 protruding from the two opposite ends of the connection portion 523. According to the embodiment, the sliding block 524 may be separated into two parts, the connection portion 523 is used for sleeving the screw rod 55, and the sliding block 524 is the third sliding portion 521. Moreover, the sliding groove 525 is defined in the side of the support member 56 facing away from the first sub-housing 11, and the sliding groove 525 is the fourth sliding portion 522. According to the embodiment, rotation of the sliding member 52 may be converted into sliding through cooperation of the sliding block 524 and the sliding groove 525 and may slide directionally in the sliding groove 525.

Figure 23:
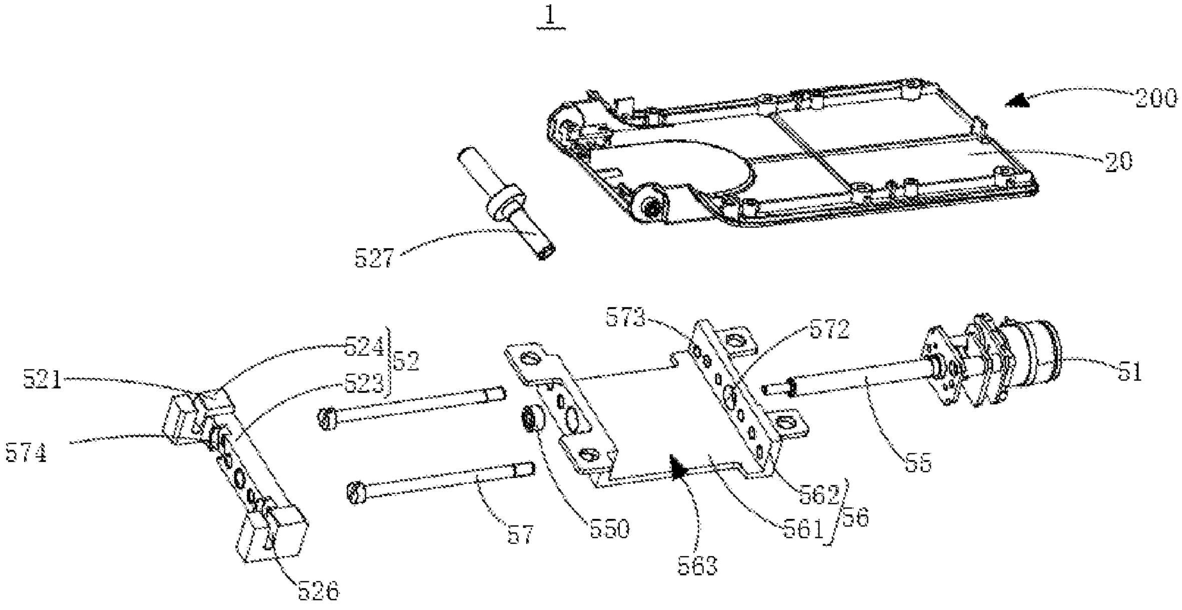
FIG. 23 is an exploded view of a part of a charging device according to yet another embodiment of the present disclosure.
Figure 24:
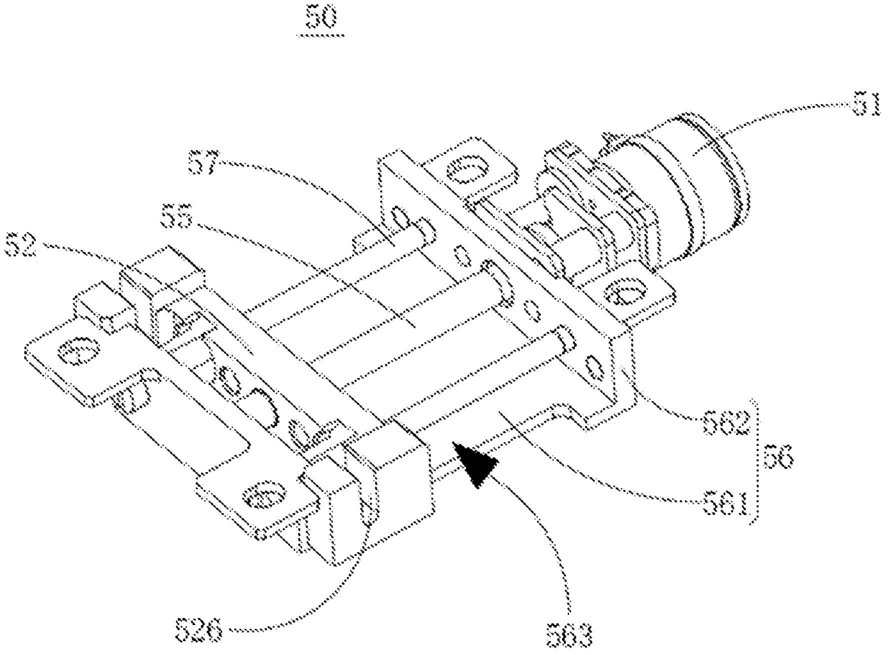
FIG. 24 is a schematic structural diagram of a motor assembly according to an embodiment of the present disclosure.

FIG. 23 is an exploded view of a part of a charging device according to yet another embodiment of the present disclosure. FIG. 24 is a schematic structural diagram of a motor assembly according to an embodiment of the present disclosure. In the present embodiment, with reference to FIG. 23 and FIG. 24, the motor assembly 50 further includes the support member 56 and the guide rod 57. The support member 56 includes a bottom plate 561, and side plates 562 that are connected to two opposite ends of the bottom plate 561 in a bending manner. A sliding space 563 is enclosed by the bottom plate 561 and the side plates 562. The sliding member 52 is disposed in the sliding space 563. A second through hole 572 is defined on the side plate 562. The screw rod 55 passes through the second through hole 572 and the sliding member 52. A third through hole 573 is defined on the side plate 562. A fourth through hole 574 is defined on the sliding member 52. The guide rod 57 is connected to the side plate 562 and passes through the third through hole 573 and the fourth through hole 574. The sliding member 52 is slidable on the guide rod 57 through the fourth through hole 574.

In the present embodiment, for the second manner of cooperative guiding of the guide rod 57, the support member 56 and the guide rod 57 may also be additionally provided. In the support member 56 according to the present embodiment, the support member 56 includes the bottom plate 561 and the side plates 562. The sliding space 563 is enclosed by the bottom plate 561 and the side plates 562, enabling the sliding member 52 to slide within the sliding space 563. In addition, the second through hole 572 is defined on the side plate 562, and the screw rod 55 passes through the second through hole 572 and the sliding member 52, thereby mounting the screw rod 55 on the side plate 562. The third through hole 573 is defined on the side plate 562. The fourth through hole 574 is defined on the sliding member 52. The guide rod 57 passes through the third through hole 573 and the fourth through hole 574 and is connected to the side plate 562. In this way, the sliding member 52 may convert the rotation of the sliding member 52 into sliding under a guiding action of the guide rod 57, and slide in an axial direction of the screw rod 55.

Optionally, at least one guide rod 57 is provided. In the present embodiment, two guide rods 57 are provided for illustration.

Optionally, the motor 51 may be fixedly connected to the support member 56 through screws, and the guide rod 57 is fixedly connected to the threaded hole of an end portion 71 of the support member 56 through the threads on an end portion 71 of the guide rod 57. Optionally, a second bearing 550 is provided inside the first through hole 213 and sleeved on an end portion 71 of the screw rod 55. The second bearing 550 can cooperate with the screw rod 55 and the support member 56 to improve rotation performance of the screw rod 55.

Figure 25:
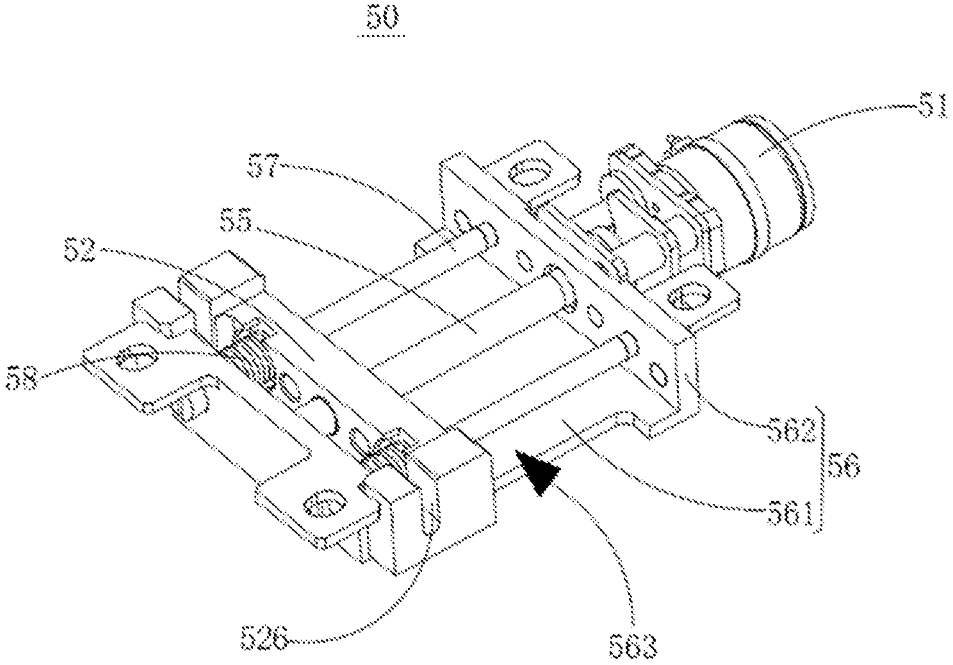
FIG. 25 is a schematic structural diagram of a motor assembly according to another embodiment of the present disclosure.

FIG. 25 is a schematic structural diagram of a motor assembly according to another embodiment of the present disclosure. Referring to FIG. 25, in the embodiment, the motor assembly 50 further includes an elastic member 58 disposed in the sliding space 563. The elastic member 58 is sleeved on the guide rod 57 and disposed between the side plate 562 and the sliding block 524. In the initial state of the charging device 1, the elastic member 58 abuts against the side plate 562 and the sliding block 524, and the elastic member 58 is in a compressed state.

In the present embodiment, the motor assembly 50 is further additionally provided with the elastic member 58, and the elastic member 58 is sleeved on the guide rod 57 and disposed between the side plate 562 and the sliding block 524. When the charging device 1 is in the initial state, i.e., when the motor 51 of the charging device 1 does not start working, or when the motor 51 has stopped working, the elastic member 58 abuts against the side plate 562 and the sliding member 52, and the elastic member 58 is in the compressed state. In this way, when the charging device 1 starts working, the elastic member 58 provides the sliding member 52 with an elastic restoring force towards a direction of the motor 51, such that the sliding member 52 can slide towards the direction of the motor 51 more easily and the second housing 20 can be more easily rotated and upraised at a beginning stage, thereby further improving the rotation performance of the second housing 20. Optionally, the elastic member 58 includes, but not limited to, a spring.

Figure 26:
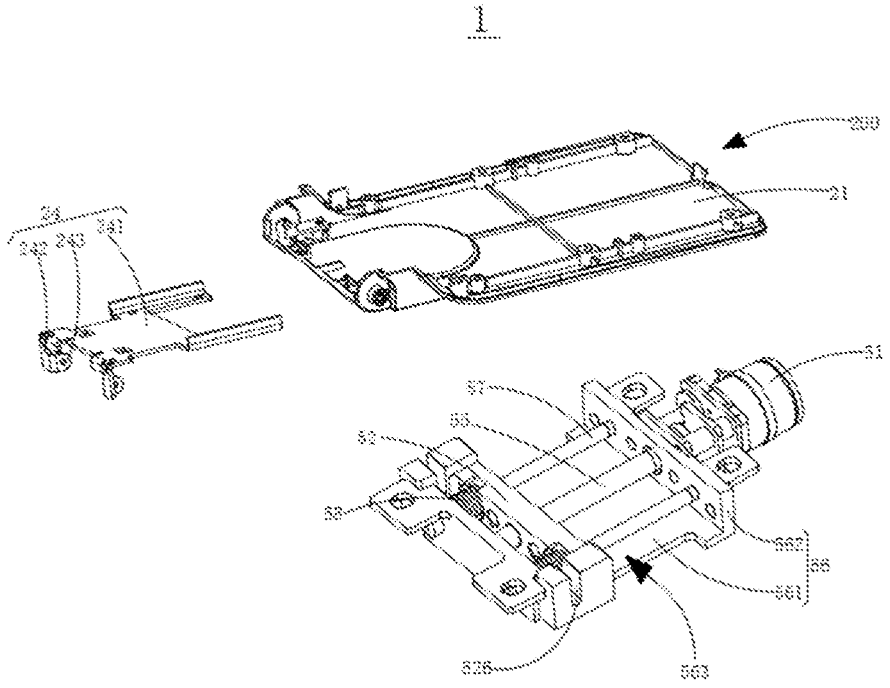
FIG. 26 is an exploded view of a part of a charging device according to yet another embodiment of the present disclosure.
Figure 27:
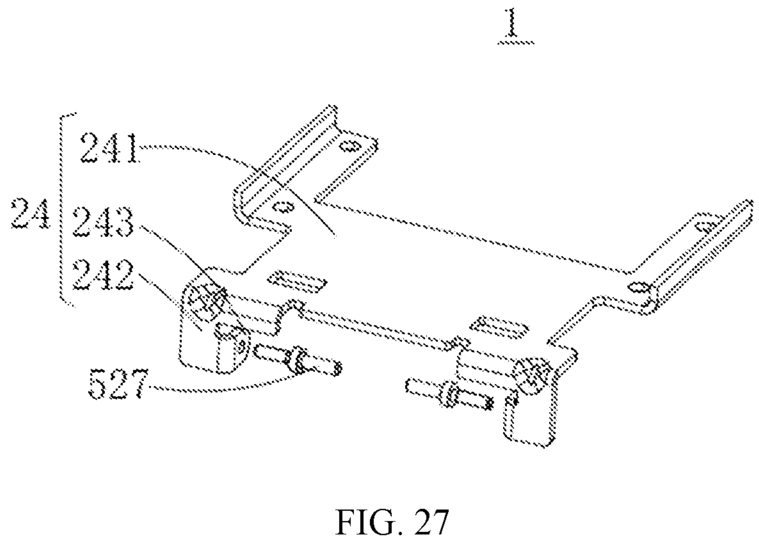
FIG. 27 is a schematic structural diagram of a second connection member and a third rotation shaft according to an embodiment of the present disclosure.
Figure 28:
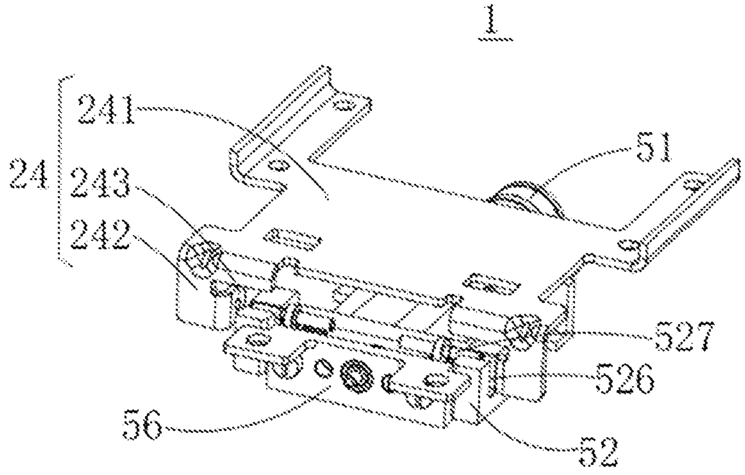
FIG. 28 is a schematic structural diagram of a mating structure of a second connection member, a third rotation shaft, and a motor assembly according to an embodiment of the present disclosure.

FIG. 26 is an exploded view of a part of a charging device according to yet another embodiment of the present disclosure. FIG. 27 is a schematic structural diagram of a second connection member and a third rotation shaft according to an embodiment of the present disclosure. FIG. 28 is a schematic diagram of a mating structure of a second connection member, a third rotation shaft, and a motor assembly according to an embodiment of the present disclosure. Referring to FIG. 26 to FIG. 28, in the embodiment, the second housing 20 further includes a second connection member 24. The second connection member 24 includes a first connection portion 241, a second connection portion 242, and a third connection portion 243. The first connection portion 241 is at least partially disposed in the third accommodation space 200 and connected to the third sub-housing 21. The second connection portion 242 is connected to the first connection member 241 in a bending manner and disposed in the second accommodation space 130 and the first accommodation space 100. The third connection portion 243 is connected to the second connection portion 242 in a bending manner and disposed in the first accommodation space 100. An end of the third rotation shaft 527 is connected to the third connection portion 243.

In the present embodiment, the end of the third rotation shaft 527 is not directly connected to the second housing 20. The second housing 20 further includes the second connection member 24, and the second connection member 24 includes the first connection portion 241, the second connection portion 242, and the third connection portion 243, such that the first connection portion 241 can be at least partially disposed in the third accommodation space 200 and connected to the third sub-housing 21. In addition, the second connection portion 242 is connected to the first connection member 241 in a bending manner and passes through the second accommodation space 130 to enter the first accommodation space 100. Finally, an end of the third rotation shaft 527 is connected to the third connection portion 243 connected to the second connection portion 242 in a bending manner.

It may also be understood that the third sub-housing 21, the fourth sub-housing 22, the first connection member 23, and the second connection member 24 are all of the separate structures. The second housing 20 in the present disclosure may be obtained by only preparing and assembling these four structural members, thereby reducing the preparing difficulty of the second housing 20.

Optionally, in the embodiment, the first connection member 23 is connected to the first connection portion 241, enabling the first connection member 23 to be directly connected to the first connection portion 241 on the second connection member 24, thereby reducing a size of the first connection member 23 and a weight of the charging device 1.

Figure 29:
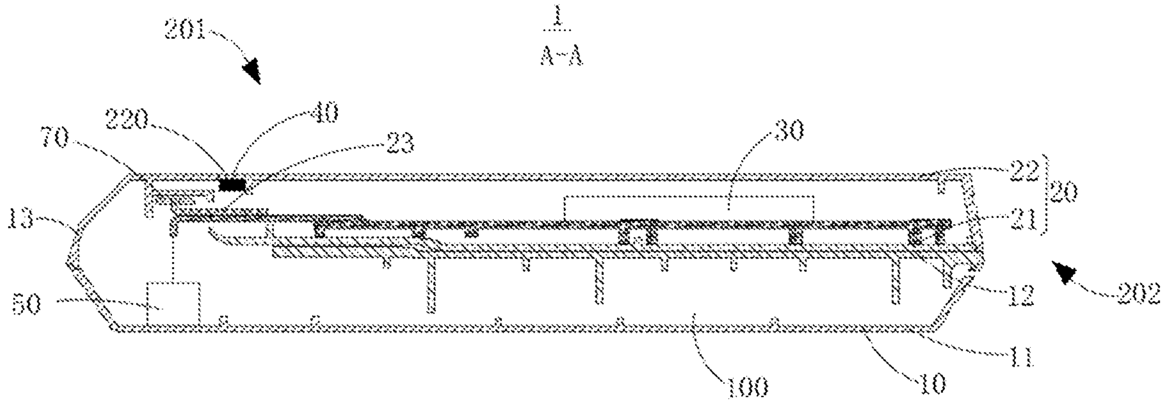
FIG. 29 is a schematic cross-sectional view along A-A direction as illustrated in FIG. 1 according to yet another embodiment of the present disclosure.

FIG. 29 is a schematic cross-sectional view along A-A direction as illustrated in FIG. 1 according to yet another embodiment of the present disclosure. Referring to FIG. 29, in the embodiment, the second housing 20 has a first end 201 and a second end 202 that are opposite to each other. The first end 201 is closer to the bracket 40 than the second end 202, and the motor assembly 50 is rotatably connected to the first end 201.

In the present embodiment, the first end 201 and the second end 202 can be understood in such a manner that: when the second housing 20 rotates, the first end 201 rotates towards the direction close to the first sub-housing 11, and the second end 202 rotates towards a direction away from the first sub-housing 11. In the present embodiment, the motor assembly 50 is connected to the first end 201. Therefore, when the second housing 20 rotates, a connection position between the second housing 20 and the motor assembly 50, i.e., the second connection member 24, is not exposed, but is shielded by the third sub-housing 21, thereby improving the appearance performance of the charging device 1.

Figure 30:
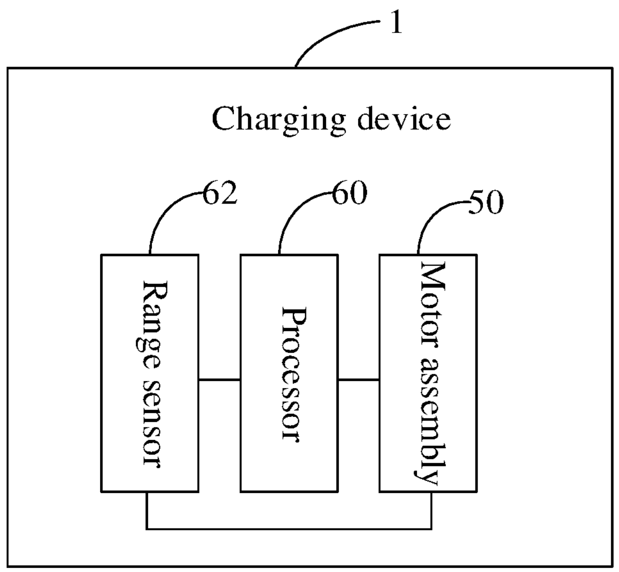
FIG. 30 is a schematic diagram of an electronic structure of a charging device according to an embodiment of the present disclosure.

FIG. 30 is a schematic diagram of an electronic structure of a charging device according to an embodiment of the present disclosure. Referring to FIG. 30, in the embodiment, the charging device 1 further includes a range sensor 62 and a processor 60 that are disposed in the first accommodation space 100. The range sensor 62 is electrically connected to the processor 60 and is connected to the motor assembly 50.

The processor 60 is configured to transmit a first control signal to the motor assembly 50 to enable the motor assembly 50 to start working. When the motor assembly 50 starts working, the range sensor 62 is configured to transmit a distance signal to the processor 60, and the processor 60 is further configured to obtain a rotation angle of the second housing 20 according to the distance signal. The processor 60 is further configured to judge whether the rotation angle of the second housing 20 is greater than or equal to a predetermined angle. When the rotation angle of the second housing 20 is greater than or equal to the predetermined angle, the processor 60 is further configured to transmit a second control signal to the motor assembly 50 to enable the motor assembly 50 to stop working.

In addition to a mechanical member of the charging device 1 described above, in the embodiment, the charging device 1 may further include a structural member having an electronic control function, such as the processor 60 and the range sensor 62. The range sensor 62 is disposed in the first accommodation space 100, is connected to the motor assembly 50, and is electrically connected to the processor 60. The processor 60 is configured to transmit the first control signal to the motor assembly 50 to enable the motor assembly 50 to start working. When the motor assembly 50 starts to work, the range sensor 62 is configured to detect at least part of a moving distance (i.e., a sliding distance of the sliding member 52) of the motor assembly 50, to obtain the distance signal. Subsequently, the range sensor 62 transmits the distance signal to the processor 60, and the processor 60 may obtain a rotation angle of the second housing 20 relative to the first housing 10 based on the distance signal.

In addition, the processor 60 may further judge a relationship between the rotation angle of the second housing 20 and the predetermined angle. The predetermined angle may be information stored in the charging device 1 in advance, or information obtained by the charging device 1 in real time from the outside. For example, the predetermined angle may be information transmitted to the charging device 1 by the user. The predetermined angle can be regarded as a maximum angle that the charging device 1 allows the second housing 20 to rotate, or the predetermined angle can be regarded as an angle at which the user wishes the second housing 20 to rotate.

When the rotation angle of the second housing 20 is greater than or equal to the predetermined angle, it indicates that the second housing 20 has rotated to an angle value set by the user, and the second housing 20 is not expected to continue to rotate. Therefore, the processor 60 is further configured to transmit the second control signal to the motor assembly 50 to enable the motor assembly 50 to stop working, such that the second housing 20 can stop rotating and the charging device 1 can finally reach the vertical state required by the user.

Figure 31:
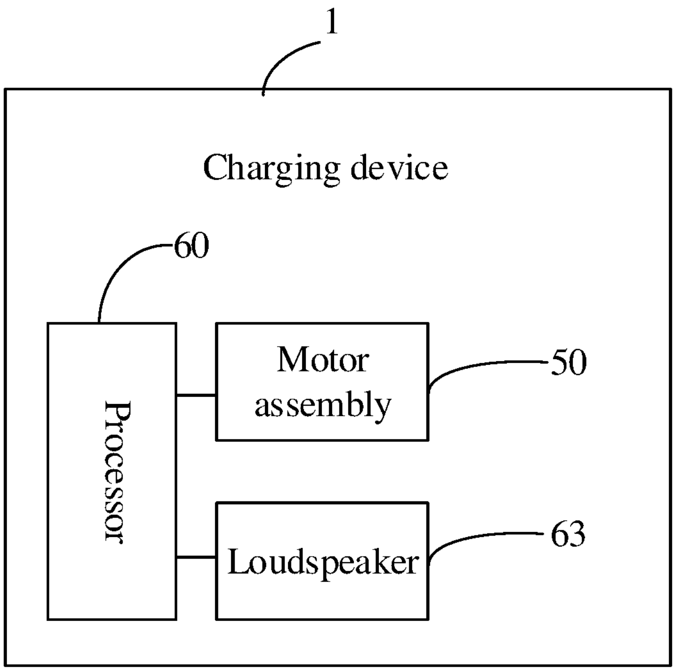
FIG. 31 is a schematic diagram of an electronic structure of a charging device according to another embodiment of the present disclosure.

FIG. 31 is a schematic diagram of an electronic structure of a charging device according to another embodiment of the present disclosure. Referring to FIG. 31, in the embodiment, the charging device 1 further includes a loudspeaker 63 disposed in the first accommodation space 100 and electrically connected to the processor 60. When the processor 60 transmits the first control signal to the motor assembly 50, the processor 60 is further configured to transmit an audio signal to the loudspeaker 63 to make the loudspeaker 63 sound. When the processor 60 transmits the second control signal to the motor assembly 50, the processor 60 is further configured to stop transmitting the audio signal to the loudspeaker 63.

In the present embodiment, the loudspeaker 63 may also be additionally provided in the first accommodation space 100, enabling the loudspeaker 63 to be electrically connected to the processor 60. When the processor 60 transmits the first control signal to the motor assembly 50, the motor assembly 50 starts working and moving. In this case, the processor 60 may transmit the audio signal to the loudspeaker 63 to make the loudspeaker 63 sound. Since the motor assembly 50 may generate some tiny noise during working, the loudspeaker 63 may be used to sound to cover the noise and cooperate with the motion of the charging device 1 to improve the user experience. In addition, when the processor 60 transmits the second control signal to the motor assembly 50 to enable the motor assembly 50 to stop working, the motor assembly 50 does not generates sound. Therefore, the processor 60 may also stop transmitting the audio signal to the loudspeaker 63, so that the loudspeaker 63 does not sound. Moreover, the user may also be informed when the charging device 1 starts and stops working based on a sounding time of the loudspeaker 63. Optionally, a plurality of loudspeaker holes is provided on the first housing 10, so that the sound transmitted by the loudspeaker 63 is propagated to the outside of the charging device 1.

Figure 32:
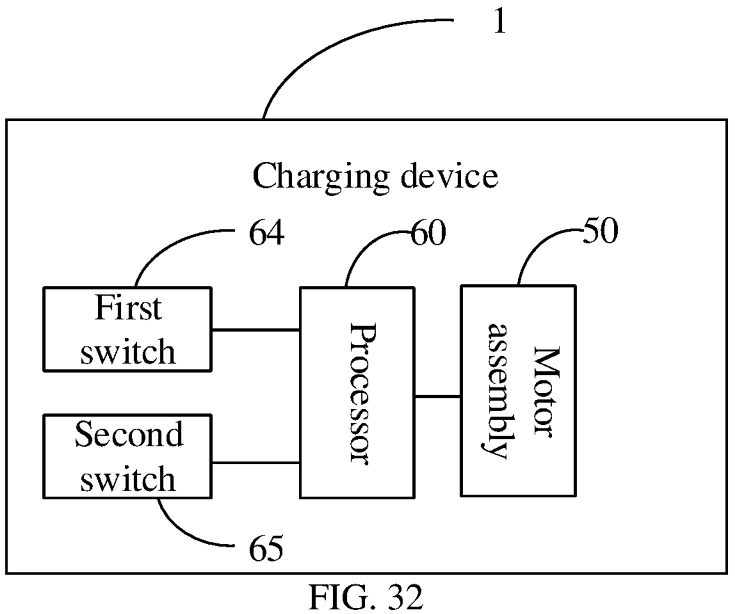
FIG. 32 is a schematic diagram of an electronic structure of a charging device according to yet another embodiment of the present disclosure.

FIG. 32 is a schematic diagram of an electronic structure of a charging device according to yet another embodiment of the present disclosure. Referring to FIG. 32, in the embodiment, the charging device 1 further includes a first switch 64 and a second switch 65 that are disposed in the first accommodation space 100. The first switch 64 and the second switch 65 are both electrically connected to the processor 60.

When the first switch 64 is pressed, the first switch 64 is configured to transmit a vertical signal to the processor 60, and the processor 60 is further configured to transmit the first control signal to the motor assembly 50 according to the vertical signal, so that the motor assembly 50 drives the second housing 20 to rotate in a first direction. When the second switch 65 is pressed, the second switch 65 is configured to transmit a horizontal signal to the processor 60, and the processor 60 is further configured to transmit a third control signal to the motor assembly 50 based on the horizontal signal, thereby enabling the motor assembly 50 to drive the second housing 20 to rotate in a second direction. The first direction is opposite to the second direction.

In the present embodiment, the first switch 64 and the second switch 65 may be additionally provided in the first accommodation space 100 and connected to the first housing 10, and the first switch 64 and the second switch 65 are both electrically connected to the processor 60. The first switch 64 and the second switch 65 are structural members for controlling when the charging device 1 starts working. Both the first switch 64 and the second switch 65 can be pressed. When the first switch 64 is pressed, the first switch 64 can transmit the vertical signal to the processor 60, and the processor 60 can transmit the first control signal to the motor assembly 50 based on the vertical signal, such that the motor assembly 50 can start working to drive the second housing 20 to rotate in the first direction. It may also be understood that when the first switch 64 is pressed, the motor assembly 50 starts to operate to switch the charging device 1 from the horizontal state to the vertical state. When the second switch 65 is pressed, the second switch 65 may transmit the horizontal signal to the processor 60, and the processor 60 is further configured to transmit the third control signal to the motor assembly 50 according to the horizontal signal, so that the motor 51 starts to operate again. Thus, the motor assembly 50 can drive the second housing 20 to rotate in the second direction. It may also be understood that, when the second switch 65 is pressed, the motor assembly 50 starts working to convert the charging device 1 from the vertical state to the horizontal state.

The first switch 64 is a switch for controlling the charging device 1 to be switched from the horizontal state to the vertical state, and the second switch 65 is a switch for controlling the charging device 1 to be switched from the vertical state to the horizontal state. The user may control the state of the charging device 1 by pressing these two switches, thereby improving operation convenience.

Further referring to FIG. 32, in the embodiment, the processor 60 is further configured to obtain a pressing time of the first switch 64 based on the vertical signal and judge whether the pressing time is smaller than a predetermined time. When the pressing time is smaller than the predetermined time, and when the rotation angle of the second housing 20 is equal to the predetermined angle, the processor 60 transmits the second control signal to the motor assembly 50. Alternatively, when the pressing time is greater than or equal to the predetermined time, and when a touch force on the first switch 64 is removed, the processor 60 transmits the second control signal to the motor assembly 50.

When the first switch 64 is pressed, i.e., when the charging device 1 is switched from the horizontal state to the vertical state, the second housing 20 cannot rotate relative to the first housing 10 all the time, and the motor assembly 50 is required to be stopped after the second housing 20 rotates to the predetermined angle, thereby enabling the second housing 20 to stop rotating. According to the embodiment, the processor 60 may further obtain the pressing time of the first switch 64 based on the vertical signal, and the processor 60 may further judge a relationship between the pressing time and the predetermined time. The predetermined time may be the information stored in the charging device 1 in advance or the information obtained by the charging device 1 in real time from the outside.

In the present embodiment, two control manners are provided based on the relationship between the pressing time and the predetermined time. In one control manner, when the pressing time is smaller than the predetermined time and the rotation angle of the second housing 20 is equal to the predetermined angle, the processor 60 transmits the second control signal to the motor assembly 50, so that the motor assembly 50 stops working. It may also be understood that, when the second housing 20 rotates to the maximum angle, the processor 60 may control the motor assembly 50 to stop working. In the other control manner, when the pressing time is greater than or equal to the predetermined time and the touch force on the first switch 64 is removed, the processor 60 may transmit the second control signal to the motor assembly 50, enabling the motor assembly 50 to stop working. It may also be understood that when the pressing time of the first switch 64 is greater than the predetermined time, the user needs to actively remove a pressing force at this time, to control the motor assembly 50 to stop working at any time, so that the second housing 20 stops rotating at any position.

Figure 33:
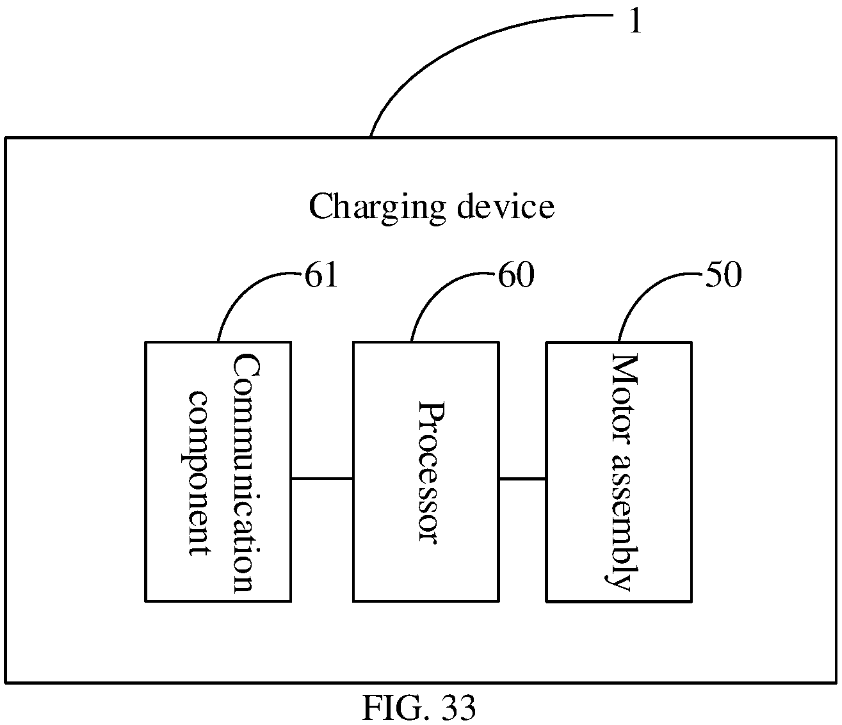
FIG. 33 is a schematic diagram of an electronic structure of a charging device according to yet another embodiment of the present disclosure.

FIG. 33 is a schematic diagram of an electronic structure of a charging device according to yet another embodiment of the present disclosure. Referring to FIG. 33, in the embodiment, the charging device 1 further includes a communication component 61 disposed in the first accommodation space 100. The communication component 61 is electrically connected to the processor 60, is configured to receive a fourth control signal from a terminal, and is further configured to transmit the fourth control signal to the processor 60. The processor 60 is further configured to control the motor assembly 50 to start working or stop working based on the fourth control signal.

In the present embodiment, the communication component 61 may also be additionally in the first accommodation space 100, and the processor 60 is electrically connected to the communication component 61. The communication component 61 is configured to receive the fourth control signal from the terminal. The terminal may be an external device such as a mobile phone, a computer, and a server, which can transmit the fourth control signal to be received by the communications component 61. The communication component 61 then transmits the fourth control signal to the processor 60, and the processor 60 may control the motor assembly 50 to move based on the fourth control signal, thereby enabling the second housing 20 to rotate relative to the first housing 10 and achieving the switching of the charging device 1 between the horizontal state and the vertical state. Optionally, the communication component 61 includes, but is not limited to, WiFi, Bluetooth, near-field communication (NFC), and the like.

Figure 34:
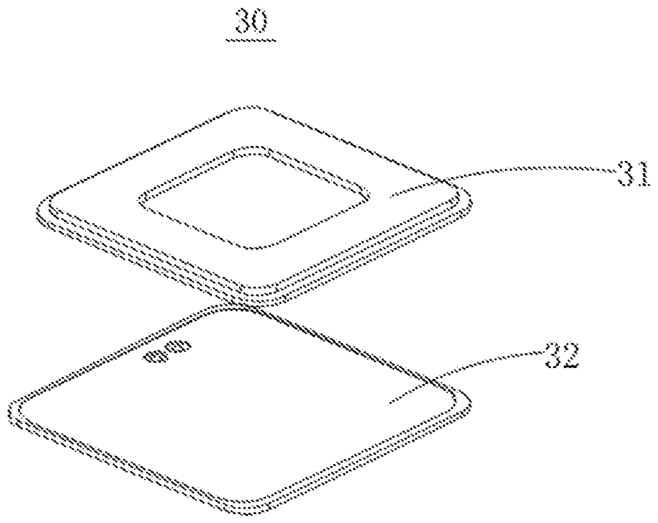
FIG. 34 is an exploded view of a charging assembly according to an embodiment of the present disclosure.

FIG. 34 is an exploded view of a charging assembly according to an embodiment of the present disclosure. Referring to FIG. 2 and FIG. 34, in the embodiment, the second housing 20 has the third accommodation space 200. The charging device 1 further includes the charging assembly 30 disposed in the third accommodation space 200. The charging assembly 30 includes a charging coil 31 and a heat dissipation bracket 32. The charging coil 31 is disposed on the heat dissipation bracket 32 and is electrically connected to the processor 60. The processor 60 is further configured to transmit a charging signal to the charging coil 31 to enable the charging coil 31 to charge the electronic device assembly 3.

In the present embodiment, the second housing 20 has the third accommodation space 200, and the charging assembly 30 is disposed in the third accommodation space 200. The charging assembly 30 may include the charging coil 31 and the heat dissipation bracket 32. The charging coil 31 is a structural member mainly configured to charge the electronic device assembly 3. The heat dissipation bracket 32 is configured to carry the charging coil 31 and dissipate heat of the charging coil 31 to timely discharge the heat generated by the charging coil 31 during working, thereby improving heat dissipation performance of the charging coil 31. In addition, the charging coil 31 is electrically connected to the processor 60, and the processor 60 is further configured to transmit the charging signal to the charging coil 31 to enable the charging coil 31 to charge the electronic device assembly 3. Optionally, the charging coil 31 may be a wired charging coil 31 or a wireless charging coil 31. According to the embodiment, the charging coil 31 is used as the wireless charging coil 31 for illustration. In this case, the charging device 1 is the wireless charging device 1, which may further improve the convenience of use of the charging device 1.

In addition, the charging assembly 30 may further include a refrigerant disposed on the heat dissipation bracket 32 and configured to cool the charging coil 31. In some embodiments, the refrigerator is electrically connected to the processor 60, and the processor 60 is further configured to transmit a cooling signal to the refrigerator to enable the refrigerator to cool the charging coil 31, thereby further timely discharging the heat generated by the charging coil 31 during working and further improving the heat dissipation performance of the charging coil 31. Optionally, the refrigerator includes, but is not limited to, a thermo-electronic chip (TEC).

Figure 35:
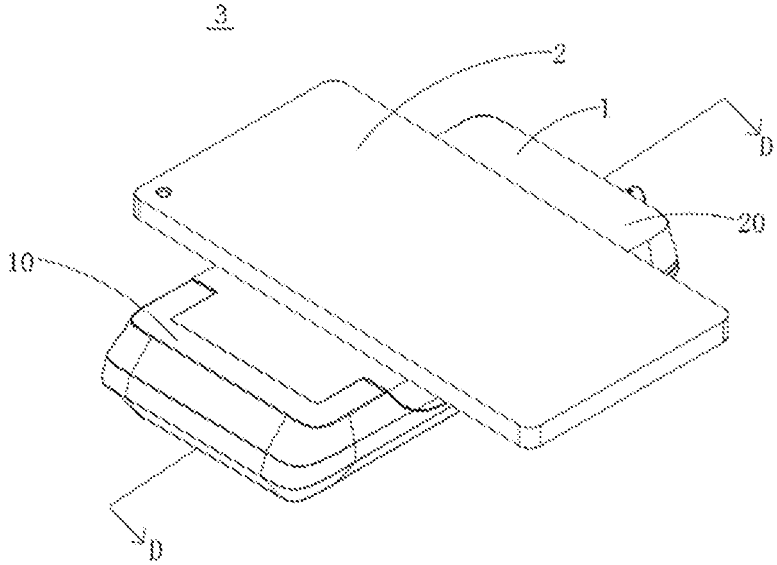
FIG. 35 is a schematic structural diagram of an electronic device assembly according to an embodiment of the present disclosure.
Figure 36:
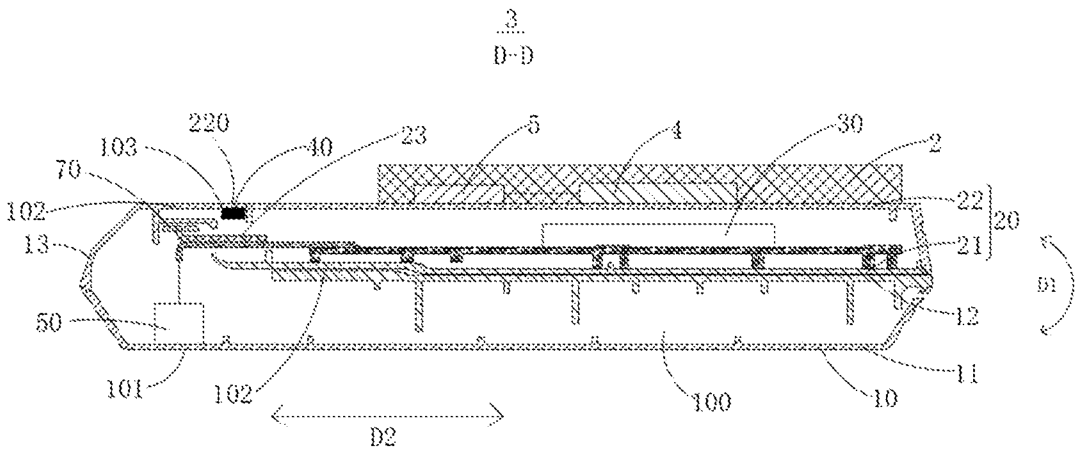
FIG. 36 is a schematic cross-sectional view along D-D direction as illustrated in FIG. 35 according to an embodiment of the present disclosure.

FIG. 35 is a schematic diagram of an electronic device assembly according to an embodiment of the present disclosure. FIG. 36 is a schematic cross-sectional view along D-D direction as illustrated in FIG. 35 according to an embodiment of the present disclosure. Referring to FIG. 35 and FIG. 36, an electronic device assembly 3 is provided in the embodiment. The electronic device assembly 3 includes an electronic device 2 including an induction coil 4 and a battery 5, and the charging device 1 according to the above embodiments. The charging coil 31 and the induction coil 4 cooperate with each other to charge the battery 5.

In addition to the specific structure of the charging device 1, an electronic device assembly 3 using the charging device 1 is further provided. The electronic device assembly 3 in the embodiment includes the electronic device 2 and the charging device 1 provided in the above embodiments of the present disclosure. The electronic device assembly 3 includes, but not limited to, mobile terminal such as a mobile phone, a tablet computer, a notebook computer, a palm computer, a personal computer (PC), a personal digital assistant (PDA), a portable media player (PMP), a navigation apparatus, a wearable device, a smart wristband, and a pedometer, and a fixed terminal such as a digital TV and a desktop computer. The electronic device assembly 3 includes the induction coil 4 and the battery 5. When the charging device 1 starts the charging function, the charging coil 31 and the induction coil 4 cooperate with each other to charge the battery 5. In the electronic device assembly 3 provided by the embodiments of the present disclosure, by using the charging device 1 provided in the above embodiments of the present disclosure, the bracket 40 can move along with the rotation of the second housing 20, enabling the bracket 40 to be switched between the protruding state and the received state. Therefore, the bracket 40 in the vertical state may protrude from the first housing 10 to limit the electronic device assembly 3, and the bracket 40 in the horizontal state may be received in the first housing 10, thereby improving the flatness of the surface of the charging device 1 and the diversity and convenience of the charging device 1.

The embodiments of the present disclosure have been described in detail above. The principle and embodiments of the present disclosure are illustrated herein. The above description is only used to facilitate the understanding of the method and the core concept of the present disclosure. Those skilled in the art can make changes to the specific embodiments and an application scope based on the concept of the present disclosure. The content of the present disclosure should not be construed as a limitation to the present disclosure.

What is claimed is:

1. A charging device, comprising:

a first housing;

a second housing movable relative to the first housing, the second housing being configured for placement of an electronic device;

a charging assembly disposed in the second housing and configured to charge the electronic device; and a bracket movable relative to the first housing and being configured to move along with a movement of the second housing relative to the first housing, enabling at least part of the bracket to be switched between a protruding state, in which the at least part of the bracket protrudes from the first housing or is flush with the first housing, and a received state, in which the at least part of the bracket is received in the first housing;

wherein the charging device further comprises a transmission member detachably connected to the second housing and the bracket, wherein the bracket is configured to be driven to move with a rotation of the second housing relative to the first housing via the transmission member between the second housing and the bracket;

wherein the charging device has a horizontal state, the horizontal state comprising an initial state and a fallback state, wherein, when the charging device is switched to the fallback state from the initial state, and when a distance travelled by the second housing relative to the first housing is equal to a first predetermined value, the transmission member is connected to the bracket; when the distance travelled by the second housing relative to the first housing is greater than the first predetermined value, the transmission member is driven by the second housing to move to drive the bracket to move; the first housing has a first surface and a second surface that are opposite to each other, and a third surface connecting the first surface with the second surface, at least part of the second surface being used to abut against the second housing; wherein the horizontal state is a state in which the second housing is parallel to the first housing; the initial state is a state in which a vertical distance between the second housing and the third surface is equal to a second predetermined value; and the fallback state is a state in which the second housing is moved relative to the first housing and the vertical distance between the second housing and the third surface is greater than the second predetermined value.

2. The charging device according to claim 1, wherein:

when the distance travelled by the second housing relative to the first housing is smaller than the first predetermined value, a spacing is defined between the transmission member and the bracket;

the first housing comprises a first sub-housing and a second sub-housing that are connected to each other, and a protruding portion disposed on a side of the second sub-housing facing away from the first sub-housing;

a first accommodation space is enclosed by the first sub-housing and the second sub-housing;

the protruding portion comprises two first side walls opposite to each other, and a second side wall disposed between and connecting the two first side walls, a second accommodation space being enclosed by the first side walls and the second side wall and in communication with the first accommodation space; and the second housing is rotatably connected to the first side walls.

3. The charging device according to claim 2, wherein:

the first side wall has a first rotation groove defined on a side thereof close to the second accommodation space, an extending direction of the first rotation groove being parallel to a moving direction of the second housing;

the second housing comprises a third sub-housing and a fourth sub-housing that are connected to each other;

the third sub-housing is closer to the first sub-housing than the fourth sub-housing;

a third accommodation space is enclosed by the third sub-housing and the fourth sub-housing;

the third sub-housing comprises a bottom wall and side walls connected to at least part of a periphery of the bottom wall in a bending manner, each of the side walls having a first through hole defined thereon; and the charging device further comprises a first rotation shaft, one end of the first rotation shaft being disposed in the third accommodation space and connected to the third sub-housing, the other end of the first rotation shaft passing through the first through hole, and the other end of the first rotation shaft being disposed outside the third accommodation space and arranged in the first rotation groove.

4. The charging device according to claim 3, wherein:

the transmission member is disposed in the second accommodation space;

the second housing further comprises a first connection member, the first connection member having an end connected to the third sub-housing and another end detachably connected to the transmission member; and the transmission member comprises end portions opposite to each other, and a middle portion connecting the end portions, the first connection member being connected to the end portions.

5. The charging device according to claim 3, wherein:

a guide rod is disposed on a side of the transmission member close to the third sub-housing;

a guide groove is defined on a side of the bracket facing away from the third sub-housing, the guide rod cooperating with the guide groove to enable the bracket to move when the transmission member is connected to the bracket and driven by the second housing to move; and in the initial state of the charging device, the guide rod is located in the guide groove or outside the guide groove.

6. The charging device according to claim 5, wherein:

the bracket comprises a body and a guide portion connected to the body;

the body is further from the first sub-housing than the guide portion;

the guide groove is defined on a side of the guide portion facing away from the third sub-housing; and an avoidance groove is defined on the side of the transmission member close to the third sub-housing, the avoidance groove being used to receive the guide portion, and the guide rod being disposed on a groove wall of the avoidance groove defined on the transmission member.

7. The charging device according to claim 5, wherein a side of the guide groove close to the third sub-housing is closer to the first sub-housing than a side of the guide groove facing away from the third sub-housing.

8. The charging device according to claim 3, wherein:

a sealing portion is disposed on a side of the fourth sub-housing close to the protruding portion; and in the initial state of the charging device, the sealing portion abuts against the protruding portion, the bracket is closer to the first sub-housing than the sealing portion, and a side surface of the protruding portion facing away from the first sub-housing, a side surface of the bracket facing away from the first sub-housing, and a side surface of the fourth sub-housing facing away from the first sub-housing are all flush with each other.

9. The charging device according to claim 3, further comprising a motor assembly disposed in the first accommodation space, the motor assembly being connected to the second housing, and the motor assembly being capable of driving the second housing to move and rotate relative to the first housing, wherein:

the motor assembly comprises a motor, a screw rod connected to the motor, a sliding member sleeved on the screw rod and threaded to the screw rod, and a fourth sliding portion;

a third sliding portion is disposed on the sliding member;

the third sliding portion and the fourth sliding portion cooperate with each other to enable the sliding member to slide on the screw rod when the motor operates;

a third rotation groove is defined on a side of the sliding member close to the second sub-housing, the third rotation groove extending towards the first sub-housing; and the charging device further comprises a third rotation shaft, the third rotation shaft having an end connected to the second housing and another end disposed in the third rotation groove.

10. The charging device according to claim 9, wherein:

the motor assembly further comprises a support member connected to the first sub-housing;

a sliding groove is defined on a side of the support member facing away from the first sub-housing; and a sliding block is disposed on a side of the sliding member close to the support member, the sliding block being slidable in the sliding groove.

11. The charging device according to claim 9, wherein:

the motor assembly further comprises a support member, a guide rod, and an elastic member;

the support member comprises a bottom plate, and side plates that are connected to two opposite ends of the bottom plate in a bending manner, a sliding space being enclosed by the bottom plate and the side plates;

the elastic member is disposed in the sliding space and sleeved on the guide rod and disposed between the side plate and the sliding block;

the sliding member is disposed in the sliding space;

a second through hole is defined on each of the side plates, the screw rod passing through the second through hole and penetrating the sliding member;

a third through hole is defined on each of the side plates;

a fourth through hole is defined on the sliding member;

the guide rod is connected to the side plate and passes through the third through hole and the fourth through hole;

the sliding member is slidable on the guide rod through the fourth through hole; and in the initial state of the charging device, the elastic member abuts against the side plate and the sliding block, and the elastic member is in a compressed state.

12. The charging device according to claim 9, wherein:

the second housing further comprises a second connection member, the second connection member comprising a first connection portion, a second connection portion, and a third connection portion;

the first connection portion is at least partially disposed in the third accommodation space and is connected to the third sub-housing;

the second connection portion is connected to the first connection member in a bending manner and disposed in the second accommodation space and the first accommodation space;

the third connection portion is connected to the second connection portion in a bending manner and disposed in the first accommodation space, an end of the third rotation shaft being connected to the third connection portion; and the first connection member is connected to the first connection portion.

13. The charging device according to claim 9, wherein:

when the charging device is switched to the fallback state from the initial state, the motor starts to operate and drives the sliding block to slide through the screw rod, to drive the second housing to move relative to the first housing;

in the fallback state of the charging device, the first rotation shaft abuts against a groove wall of the first rotation groove defined on the first side wall; and when the charging device is switched to the vertical state from the fallback state, through further sliding of the sliding block, another end of the third rotation shaft is driven to slide in the third rotation groove to drive the second housing to rotate relative to the first housing.

14. The charging device according to claim 2, wherein:

a first movable portion is disposed on a side of the first side wall close to the second accommodation space;

a second movable portion is disposed on a side of the bracket close to the first side wall, the first movable portion and the second movable portion cooperating with each other to enable the bracket to move relative to the first side wall; and a stop portion is disposed on the side of the first side wall close to the second accommodation space, the stop portion being closer to the first sub-housing than the first movable portion.

15. The charging device according to claim 2, wherein:

a first sliding portion is disposed on a side of the first side wall close to the second accommodation space;

a second sliding portion is disposed on a side of the transmission member close to the first side wall, the first sliding portion and the second sliding portion cooperating with each other to enable the transmission member to slide on the first housing;

the first sliding portion comprises a sliding groove;

the second sliding portion comprises a sliding block; and in the fallback state of the charging device, the sliding block is partially disposed in the sliding groove.

16. The charging device according to claim 2, further having a vertical state, the vertical state being a state in which an included angle is formed between the second housing and the first housing, wherein:

when the charging device is switched to the vertical state from the fallback state, a position of the bracket relative to the first housing remains unchanged, and the transmission member is separated from the second housing.

17. The charging device according to claim 16, wherein:

the second housing comprises a first connection member, the first connection member having an end connected to the third sub-housing and another end detachably connected to the transmission member;

a first snap portion is disposed at an end of the first connection member close to the transmission member;

a second snap portion is disposed on the transmission member, the first snap portion and the second snap portion being engaged with each other to enable the first snap portion to be in a snap-fit connection with the second snap portion in the horizontal state of the charging device, and to enable the first snap portion to be separated from the second snap portion in the vertical state of the charging device; and in the horizontal state of the charging device, the first connection member is closer to the first sub-housing than the transmission member.

18. An electronic device assembly, comprising:

an electronic device comprising an induction coil and a battery; and a charging device, a charging coil and the induction coil cooperating with each other to charge the battery, wherein the charging device comprises:

a first housing;

a second housing capable of translationally moving and rotating relative to the first housing, the second housing being configured for placement of an electronic device;

a charging assembly disposed in the second housing and configured to charge the electronic device; and a bracket movable relative to the first housing and movable along with a rotation of the second housing relative to the first housing, enabling at least part of the bracket to be switched between a protruding state, in which the at least part of the bracket protrudes from the first housing or is flush with the first housing, and a received state, in which the at least part of the bracket is received in the first housing;

wherein the charging device further comprises a transmission member detachably connected to the second housing and the bracket, wherein the bracket is configured to be driven to move with a rotation of the second housing relative to the first housing via the transmission member between the second housing and the bracket;

wherein the charging device has a horizontal state, the horizontal state comprising an initial state and a fallback state, wherein, when the charging device is switched to the fallback state from the initial state, and when a distance travelled by the second housing relative to the first housing is equal to a first predetermined value, the transmission member is connected to the bracket; when the distance travelled by the second housing relative to the first housing is greater than the first predetermined value, the transmission member is driven by the second housing to move to drive the bracket to move; the first housing has a first surface and a second surface that are opposite to each other, and a third surface connecting the first surface with the second surface, at least part of the second surface being used to abut against the second housing; wherein the horizontal state is a state in which the second housing is parallel to the first housing; the initial state is a state in which a vertical distance between the second housing and the third surface is equal to a second predetermined value; and the fallback state is a state in which the second housing is moved relative to the first housing and the vertical distance between the second housing and the third surface is greater than the second predetermined value.

* * * * *